(12) United States Patent
Qiu et al.

(10) Patent No.: US 11,565,181 B2
(45) Date of Patent: Jan. 31, 2023

(54) VIRTUAL OBJECT CONTROL METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Meng Qiu, Shenzhen (CN); Junming Wang, Shenzhen (CN); Jiaqi Pan, Shenzhen (CN); Ya Zhang, Shenzhen (CN); Shuting Zhang, Shenzhen (CN); Qinghua Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 171 days.

(21) Appl. No.: 16/909,954

(22) Filed: Jun. 23, 2020

(65) Prior Publication Data

US 2020/0316473 A1 Oct. 8, 2020

Related U.S. Application Data

(63) Continuation of application No. PCT/CN2018/115924, filed on Nov. 16, 2018.

(30) Foreign Application Priority Data

Feb. 9, 2018 (CN) .......................... 201810132752.1

(51) Int. Cl.
*A63F 13/56* (2014.01)
*A63F 13/42* (2014.01)
(Continued)

(52) U.S. Cl.
CPC .............. *A63F 13/56* (2014.09); *A63F 13/42* (2014.09); *A63F 13/5378* (2014.09); *G06F 3/0488* (2013.01); *G06F 3/04815* (2013.01)

(58) Field of Classification Search
CPC ...... A63F 13/56; A63F 13/42; A63F 13/5378; G06F 3/04815; G06F 3/0488
See application file for complete search history.

(56) References Cited

U.S. PATENT DOCUMENTS 6,729,954 B2 * 5/2004 Atsumi ................... A63F 13/56
434/11
7,677,977 B2 * 3/2010 Maehiro ............... A63F 13/577
273/317.1

(Continued)

FOREIGN PATENT DOCUMENTS

CN 103198234 A 7/2013
CN 104548598 A 4/2015
(Continued)

OTHER PUBLICATIONS

The World Intellectual Property Organization (WIPO) International Search Report for PCT/CN2018/115924 dated Feb. 18, 2019 6 Pages (including translation).

(Continued)

*Primary Examiner* — Malina D. Blaise
(74) *Attorney, Agent, or Firm* — Anova Law Group PLLC

(57) ABSTRACT

A virtual object control method includes: displaying a path drawing interface that comprises a map of a virtual environment; obtaining a path finding instruction associated with a virtual object in the virtual environment according to an operation track of a drawing operation performed in the path drawing interface. The drawing operation is performed on the map of the virtual environment. The method also includes generating a moving path according to the path finding instruction; and controlling the virtual object to move along the moving path in the virtual environment.

19 Claims, 12 Drawing Sheets

(51) Int. Cl.
*A63F 13/5378* (2014.01)
*G06F 3/04815* (2022.01)
*G06F 3/0488* (2022.01)

(56) References Cited

U.S. PATENT DOCUMENTS

| | | | | |
|---|---|---|---|---|
| 7,833,098 B2* | 11/2010 | Ohta | ............... | G06F 3/04886 463/31 |
| 10,010,793 B2* | 7/2018 | Johnson | ............... | A63F 13/5375 |
| 10,434,411 B2* | 10/2019 | Tezuka | ............... | A63F 13/25 |
| 10,821,362 B2* | 11/2020 | Tanaka | ............... | A63F 13/52 |
| 11,151,773 B2* | 10/2021 | Wang | ............... | G06T 15/20 |
| 2004/0157662 A1* | 8/2004 | Tsuchiya | ............... | A63F 13/10 463/32 |
| 2005/0221880 A1* | 10/2005 | Kando | ............... | A63F 13/10 463/9 |
| 2006/0094502 A1* | 5/2006 | Katayama | ............... | A63F 13/2145 463/31 |
| 2006/0258453 A1* | 11/2006 | Kando | ............... | A63F 13/426 463/36 |
| 2006/0281546 A1* | 12/2006 | Iwamoto | ............... | A63F 13/10 463/32 |
| 2007/0218992 A1* | 9/2007 | Maehiro | ............... | A63F 13/00 463/31 |
| 2007/0265082 A1* | 11/2007 | Shimura | ............... | A63F 13/577 463/37 |
| 2014/0357359 A1* | 12/2014 | Kando | ............... | A63F 13/00 463/31 |
| 2015/0038223 A1* | 2/2015 | Watabe | ............... | A63F 13/57 463/31 |
| 2016/0005229 A1* | 1/2016 | Lee | ............... | G06T 11/60 345/419 |
| 2016/0148417 A1* | 5/2016 | Kim | ............... | G06T 19/006 345/419 |
| 2018/0024660 A1* | 1/2018 | Wang | ............... | G06F 3/0484 273/110 |
| 2018/0043260 A1* | 2/2018 | Tang | ............... | A63F 13/822 |
| 2019/0070495 A1* | 3/2019 | He | ............... | A63F 13/847 |
| 2019/0070497 A1* | 3/2019 | He | ............... | G06F 3/0488 |
| 2019/0076739 A1* | 3/2019 | Ge | ............... | A63F 13/537 |
| 2019/0091574 A1* | 3/2019 | Wei | ............... | A63F 13/5378 |
| 2019/0126151 A1* | 5/2019 | Li | ............... | A63F 13/54 |
| 2019/0255437 A1* | 8/2019 | Wang | ............... | A63F 13/2145 |
| 2020/0070044 A1* | 3/2020 | Seo | ............... | G06F 3/165 |
| 2020/0125244 A1* | 4/2020 | Feinstein | ............... | G06F 3/04883 |
| 2020/0316470 A1* | 10/2020 | Yang | ............... | A63F 13/5378 |
| 2021/0354039 A1* | 11/2021 | Wan | ............... | A63F 13/60 |

FOREIGN PATENT DOCUMENTS

| | | |
|---|---|---|
| CN | 104645616 A | 5/2015 |
| CN | 104740875 A | 7/2015 |
| CN | 104740876 A | 7/2015 |
| CN | 105209138 A | 12/2015 |
| CN | 105597310 A | 5/2016 |
| CN | 105955628 A | 9/2016 |
| CN | 106621329 A | 5/2017 |
| CN | 107096222 A | 8/2017 |
| CN | 108245888 A | 7/2018 |
| JP | 2017051494 A | 3/2017 |
| WO | 2014173187 A1 | 10/2014 |

OTHER PUBLICATIONS

The State Intellectual Property Office of the People's Republic of China (SIPO) Office Action 1 for 201810132752.1 dated Jun. 19, 2020 10 Pages (including translation).

The State Intellectual Property Office of the People's Republic of China (SIPO) Office Action 2 for 201810132752.1 dated Apr. 27, 2021 12 Pages (including translation).

Anonymous, The realization of automatic wayfinding in online games (2), Get the nearest reachable point, May 22, 2010 (May 22, 2010), Retrieved from the InternetURL: http://blog.sina.com.cn/s/blog_41630e7e0100j0yj.html. 6 pages (including translation).

* cited by examiner

VIRTUAL OBJECT CONTROL METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2018/115924, filed on Nov. 16, 2018, which claims priority to Chinese Patent Application No. 201810132752.1, filed on Feb. 9, 2018 and entitled "VIRTUAL OBJECT CONTROL METHOD AND APPARATUS, AND COMPUTER DEVICE", which is incorporated herein by reference in its entirety.

FIELD OF THE TECHNOLOGY

The present disclosure relates to the field of computer application technologies, and in particular, to a virtual object control method and apparatus, a computer device, and a storage medium.

BACKGROUND OF THE DISCLOSURE

Automatic path finding is one of common functions in many application programs (for example, a virtual reality application program, a three-dimensional map program, a military simulation program, a first-person shooting game, and a multiplayer online battle arena game) in which a virtual environment is constructed.

In the related art, a passable area in a virtual environment is generally divided into several navigation meshes. During automatic path finding, a list of mesh paths is obtained by calculating mesh paths that need to be passed through from a mesh in which a starting point is located to a mesh in which an endpoint is located according to a preset algorithm. In the related art, a list of navigation mesh paths that need to be passed through is generally obtained through calculation by adopting an A-star algorithm, then a list of passed path points is obtained through calculation according to the list of navigation mesh paths, and a path finding path is then obtained by connecting various path points in the list of path points, to finally automatically control a virtual object to move along the path finding path.

However, in the related art, a path finding path between the starting point and the endpoint is obtained through calculation according to a fixed algorithm. Provided that the starting point and the endpoint are determined, the path finding path obtained through calculation is fixed, a moving path of the virtual object is relatively undiversified, and as a result, an effect of automatically controlling the virtual object to move is relatively poor.

SUMMARY

Embodiments of the present disclosure provide a virtual object control method and apparatus, a computer device, and a storage medium, which may be used for resolving the problem that in the related art, the path finding path obtained through calculation is fixed, the moving path of the virtual object is relatively undiversified, and as a result, the effect of automatically controlling the virtual object to move is relatively poor. Technical solutions are as follows:

According to an aspect, a virtual object control method is provided, performed by a first terminal, and the method including: displaying a path drawing interface that comprises a map of a virtual environment; obtaining a path finding instruction associated with a virtual object in the virtual environment according to an operation track of a drawing operation performed in the path drawing interface. The drawing operation is performed on the map of the virtual environment. The method also includes generating a moving path according to the path finding instruction; and controlling the virtual object to move along the moving path in the virtual environment.

According to an aspect, a virtual object control apparatus is provided, including: a memory and a processor coupled to the memory. The processor is configured to: display a path drawing interface that comprises a map of virtual environment; obtain a path finding instruction associated with a virtual object in the virtual environment according to an operation track of a drawing operation performed in the path drawing interface. The drawing operation is performed on the map of the virtual environment. The processor is also configured to generate a moving path according to the path finding instruction; and control the virtual object to move along the moving path in the virtual environment.

According to an aspect, a non-transitory computer-readable storage medium is provided. The storage medium stores at least one instruction, at least one program, a code set or an instruction set, the at least one instruction, the at least one program, the code set or the instruction set being loaded and executed by a processor to implement: displaying a path drawing interface that comprises a map of a virtual environment; obtaining a path finding instruction associated with a virtual object in the virtual environment according to an operation track of a drawing operation performed in the path drawing interface. The drawing operation is performed on the map of the virtual environment. The at least one instruction, the at least one program, the code set or the instruction set also cause the processor to implement generating a moving path according to the path finding instruction; and controlling the virtual object to move along the moving path in the virtual environment.

It is to be understood that the foregoing general descriptions and the following detailed descriptions are merely exemplary and explanatory, and the present disclosure is not limited thereto.

BRIEF DESCRIPTION OF THE DRAWINGS

The accompanying drawings herein form a part of the specification, illustrate embodiments consistent with the present disclosure and are used to explain the principles of the present disclosure together with the specification.

DESCRIPTION OF EMBODIMENTS

Exemplary embodiments are described in detail herein, and the embodiments are illustratively shown in the accompanying drawings. In a case that the following descriptions are made with reference to the accompanying drawings, unless indicated otherwise, same numbers in different accompanying drawings represent same or similar elements. The following implementations described in the following exemplary embodiments do not represent all implementations that are consistent with the present disclosure. On the contrary, the implementations are merely examples of apparatuses and methods that are described in detail in the appended claims and that are consistent with some aspects of the present disclosure.

Virtual environment: a virtual environment displayed (or provided) by an application program when run on a terminal. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment, description is made by using an example in which the virtual environment is a three-dimensional virtual environment in the following embodiments, but this is not limited. Optionally, the virtual environment is further used for a virtual environment battle between at least two virtual roles. Optionally, the virtual environment is further used for a battle performed between at least two virtual roles by using virtual guns. Optionally, the virtual environment is further used for a battle performed between at least two virtual roles by using virtual guns in a range of a target region, and the range of the target region may be continuously decreased as time goes by in the virtual environment.

Virtual object: a movable object in a virtual environment. The movable object may be at least one of a virtual character, a virtual animal, and a cartoon character. Optionally, in a case that the virtual environment is a three-dimensional virtual environment, the virtual object is a three-dimensional model created based on a skeletal animation technology. Each virtual object has a shape and a volume in the three-dimensional virtual environment, and occupies some space in the three-dimensional virtual environment.

The virtual environment is generally generated by an application program in a computer device such as a terminal and displayed based on hardware (for example, a screen) in the terminal. The terminal may be a mobile terminal such as a smartphone, a tablet computer, or an ebook reader. Alternatively, the terminal may be a personal computer device such as a notebook computer or a fixed computer.

Figure 1:
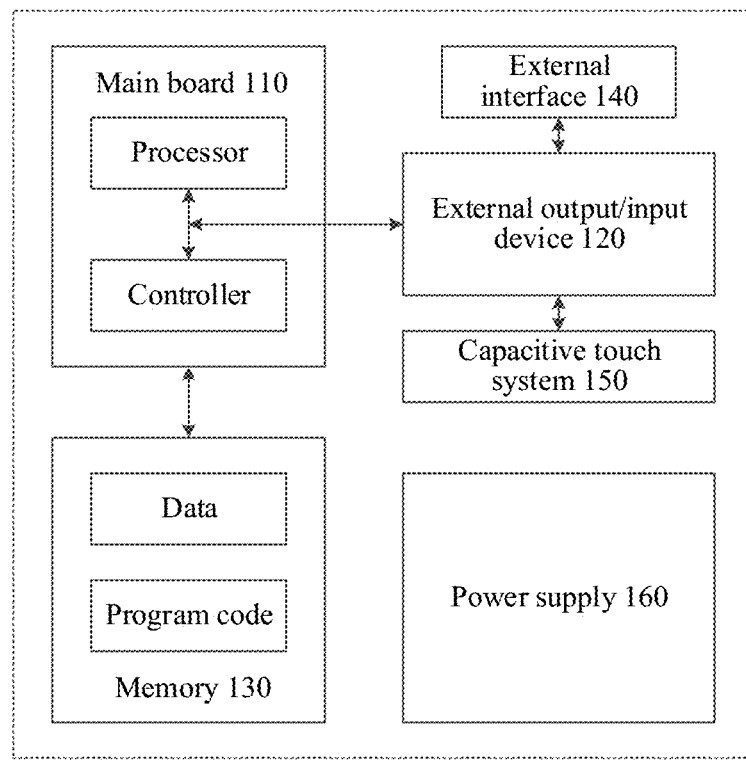
FIG. 1 is a schematic structural diagram of a terminal according to an exemplary embodiment of the present disclosure.

FIG. 1 shows a schematic structural diagram of a terminal according to an exemplary embodiment of the present disclosure. As shown in FIG. 1, the terminal includes a main board 110, an external output/input device 120, a memory 130, an external interface 140, a capacitive touch system 150, and a power supply 160.

Processing elements such as a processor and a controller are integrated in the main board 110.

The external output/input device 120 may include a display component (for example, a display screen), a sound playback component (for example, a loudspeaker), a sound collecting component (for example, a microphone), and various types of buttons.

The memory 130 stores program code and data.

The external interface 140 may be an earphone interface, a charging interface, and a data interface.

The capacitive touch system 150 may be integrated in the display component or a button of the external output/input device 120, and the capacitive touch system 150 is configured to detect a touch operation performed by the user on the display component or the button.

The power supply 160 is configured to supply power to other components in the terminal.

In an embodiment of the present disclosure, the processor in the main board 110 may generate a virtual environment by executing or invoking program code and data stored in the memory, and display the generated virtual environment by using the external output/input device 120. In a process of displaying the virtual environment, a touch operation performed when the user interacts with the virtual environment may be detected by using the capacitive touch system 150.

Figure 2:
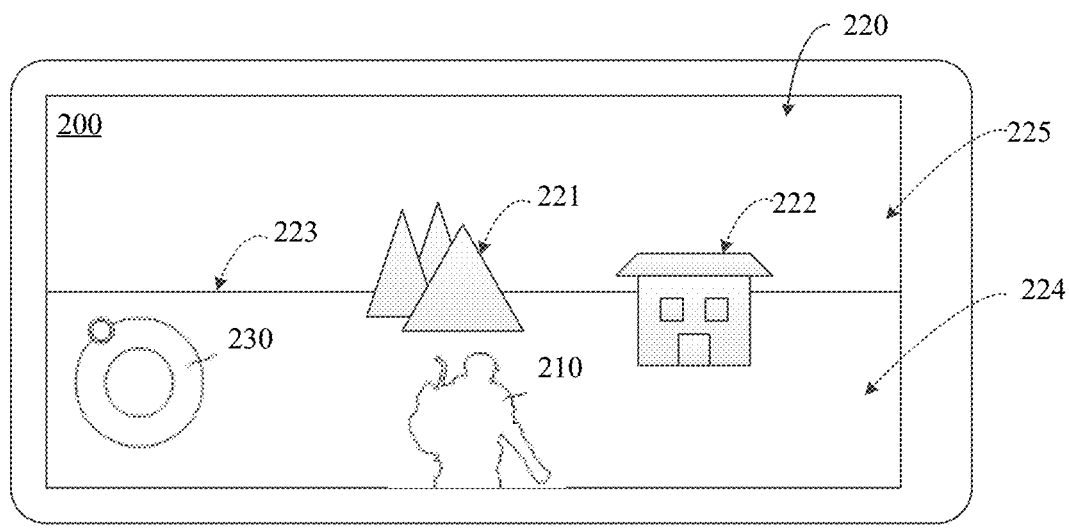
FIG. 2 is a schematic diagram of a display interface of a virtual environment according to an exemplary embodiment of the present disclosure.

The virtual environment may be a three-dimensional virtual environment, or the virtual environment may be a two-dimensional virtual environment. Using an example in which the virtual environment is a three-dimensional virtual environment, FIG. 2 shows a schematic diagram of a display interface of a virtual environment according to an exemplary embodiment of the present disclosure. As shown in FIG. 2, a display interface 200 of the virtual environment includes a virtual object 210, an environment picture 220 of a three-dimensional virtual environment, and at least one set of virtual control button 230, where the virtual control button 230 is an optional control element, and a user may control the virtual object 210 by using the virtual control button 230.

In FIG. 2, the virtual object 210 is a three-dimensional model in the three-dimensional virtual environment, and the environment picture of the three-dimensional virtual environment displayed in the display interface 200 includes objects observed from a viewing angle of the virtual object 210. Exemplarily, as shown in FIG. 2, under the observation from the viewing angle of the virtual object 210, the displayed environment picture 220 of the three-dimensional virtual environment includes the earth 224, the sky 225, the horizon 223, a hill 221, and a factory 222.

The virtual object 210 may move in real time under the control of the user. For example, the virtual control button 230 shown in FIG. 2 is a virtual button configured to control the movement of the virtual object 210, and in a case that the user touches the virtual control button 230, the virtual object 210 may move toward a direction of a touch point relative to a center of the virtual control button 230 in the virtual environment.

In addition, in the present disclosure, the virtual object in the virtual environment may further automatically move along a moving path planned in advance. Using the virtual environment shown in FIG. 2 as an example, the user may plan a moving path through a path planning operation. After that, the virtual object 210 may automatically move along the planned moving path in the virtual environment without the need of touching the virtual control button 230 by the user again.

Figure 3:
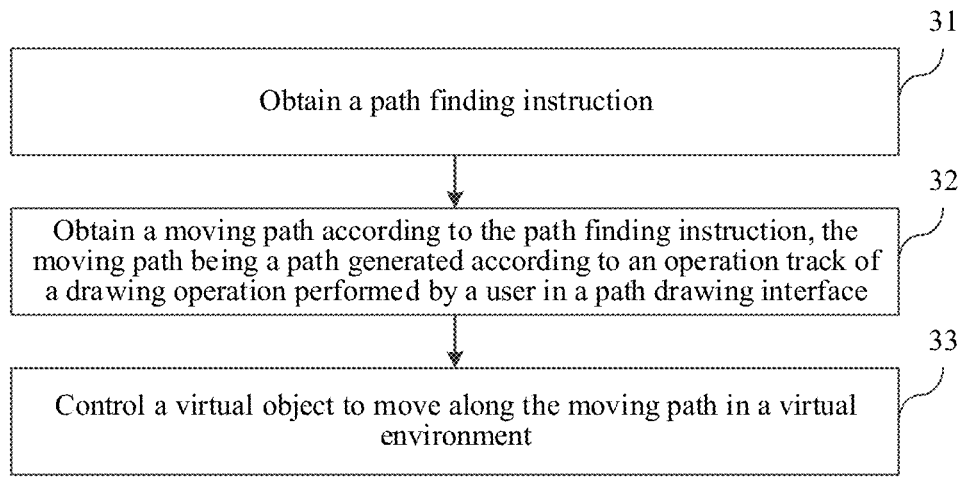
FIG. 3 is a schematic diagram of a virtual object control process according to an exemplary embodiment of the present disclosure.

FIG. 3 shows a schematic diagram of a virtual object control process according to an exemplary embodiment of the present disclosure. As shown in FIG. 3, a terminal on which an application program corresponding to the foregoing virtual environment is run may control a virtual object to automatically move along a planned moving path by performing the following steps:

Step 31: Obtain a path finding instruction.

Step 32: Obtain a moving path according to the path finding instruction, the moving path being a path generated according to an operation track of a drawing operation performed in a path drawing interface.

The path drawing interface includes a map of the virtual environment, and the drawing operation is performed on the map of the virtual environment. In one embodiment, the drawing operation may be a slide drawing operation. In another embodiment, the drawing operation may include tapping multiple key points on the map, and a path based on the tapped key points may be generated accordingly.

Specific operation forms of the foregoing slide drawing operation may be different according to different manners of operating the virtual object by the user.

For example, in a case that the user controls the virtual object by using the virtual button in the touch screen, the foregoing slide drawing operation may be a touch slide operation performed by the user in a map region of the virtual environment.

Alternatively, in a case that the user controls the virtual object by using a keyboard and a mouse, the foregoing slide drawing operation may be an operation that the user clicks one button of the mouse and keeps the clicking state, and then moves a cursor in the map of the virtual environment by using the mouse while keeping the clicking state.

Alternatively, in a case that the user controls the virtual object by using a gamepad, the foregoing slide drawing operation may be an operation that the user presses one button of the gamepad, and then moves a cursor in the map of the virtual environment by using a joystick of the gamepad.

Step 33: Control a virtual object to move along the moving path in a virtual environment.

In a case that the terminal displays a display image of the virtual environment, a moving control operation performed by the user by using a physical key of a keyboard, a joystick of a gamepad, or a virtual button in a touch screen may be received, and the virtual object may be controlled to move in the virtual environment according to the received moving control operation.

Further, an upper layer of the display image of the virtual environment may further display a path drawing interface including a map of the virtual environment, a slide operation track of the slide drawing operation performed by the user in the map of the virtual environment may correspondingly generate a path finding instruction indicating a moving path, and after the terminal obtains the path finding instruction, the virtual object may be automatically controlled to move according to the moving path indicated by the path finding instruction.

In some embodiments of the present disclosure, according to the solution shown in FIG. 3, in a case that an application program is run on a terminal and a virtual environment is generated and displayed, the terminal may obtain, in response to receiving a path finding instruction, a moving path according to the path finding instruction, and control the virtual object to move along the moving path in the virtual environment. In this process, the moving path obtained by the terminal is a path generated according to a slide track of a slide drawing operation performed by the user in the map displayed by the path drawing interface. That is, according to the solution shown in FIG. 3, the user may indicate a subsequent moving path of automatic path finding of a virtual object in a virtual environment by performing a slide operation in the map displayed by the path drawing interface and using the slide track, and the moving path may be flexibly set by the user according to an actual requirement, so that control over the moving path of the automatic path finding of the virtual object is more diversified, thereby improving an effect of controlling the virtual object in the virtual environment.

In a possible implementation, the user may perform the foregoing drawing operation in a path drawing interface displayed by a current terminal, to make the current terminal control a virtual object in a virtual environment displayed by the current terminal to move along a moving path corresponding to an operation track of the drawing operation.

Figure 4:
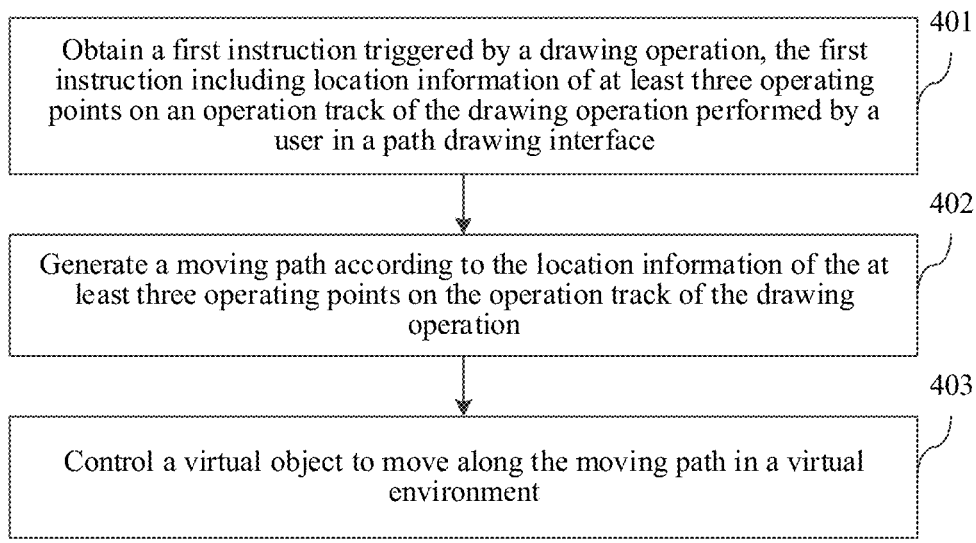
FIG. 4 is a flowchart of a virtual object control method according to an exemplary embodiment of the present disclosure.

FIG. 4 shows a flowchart of a virtual object control method according to an exemplary embodiment of the present disclosure, and the method may be applied to a first terminal. Using an example in which the user performs a drawing operation in a path drawing interface displayed by the first terminal, to make the first terminal control a virtual object in a virtual environment displayed by the first terminal to move along a moving path corresponding to an operation track of the drawing operation, the virtual object control method may include the following steps:

Step 401: Obtain a first instruction triggered by a drawing operation, the first instruction including location information of at least three operating points on an operation track of the drawing operation performed by a user in a path drawing interface.

The location information of the foregoing operating points may be information indicating locations of the corresponding operating points in the path drawing interface. For example, the location information may include coordinates of the corresponding operating points in a coordinate system corresponding to the path drawing interface.

In some embodiments of the present disclosure, the path finding instruction is a first instruction generated by triggering a drawing operation performed by the user in a path drawing interface displayed by the first terminal. The first terminal may obtain the first instruction by performing the following step 401*a* to step 401*d*.

Step 401*a*: Display a path drawing interface.

In some embodiments of the present disclosure, in a case that the user needs to autonomously plan a moving path of the virtual object, a predetermined operation may be performed on an entry of a drawing interface in the virtual environment, and after the first terminal detects the predetermined operation, the path drawing interface is displayed on an upper layer of a display interface of the virtual environment.

Figure 5:
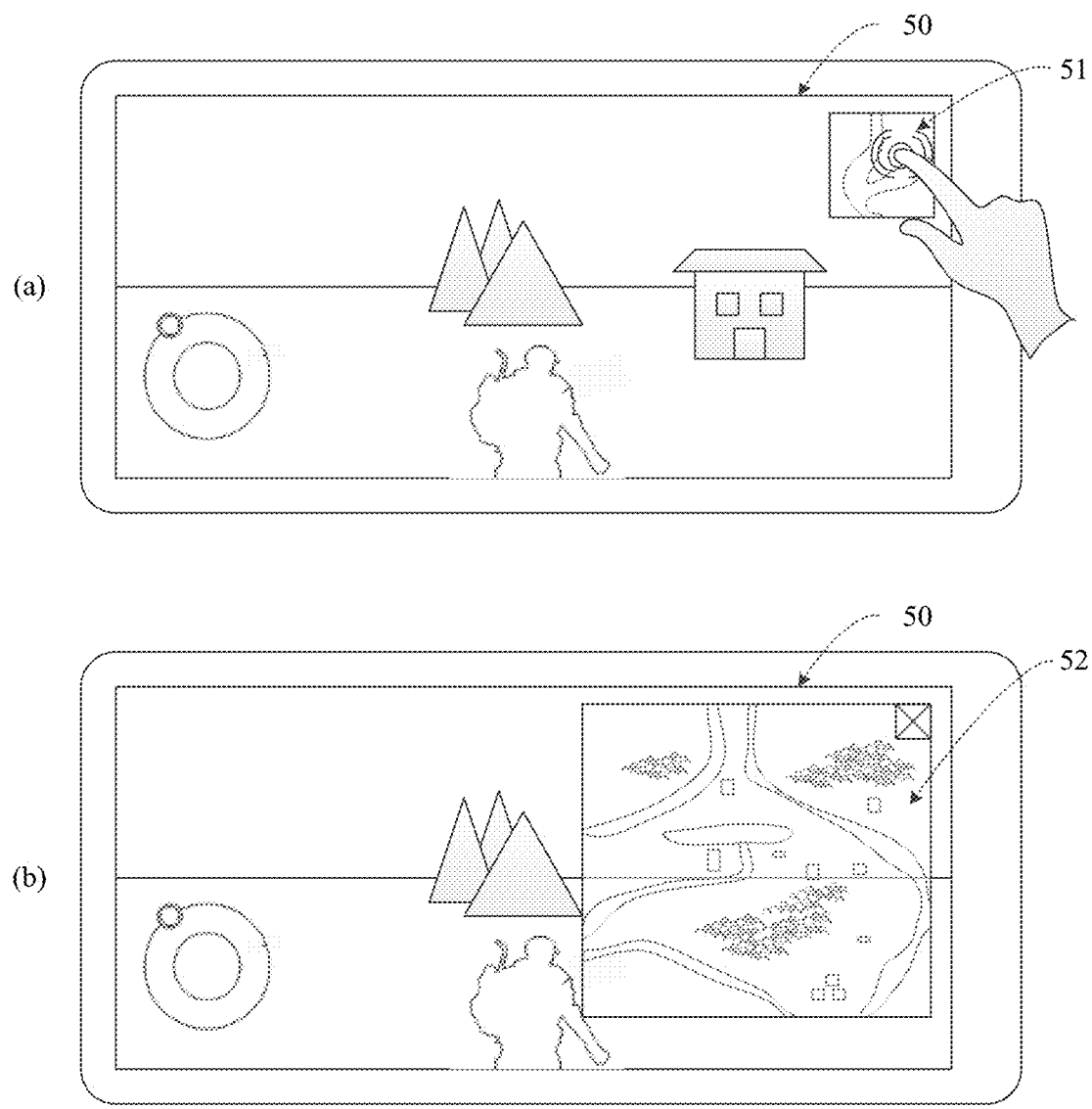
FIG. 5 is a schematic diagram of displaying a path drawing interface involved in the embodiment shown in FIG. 4.

The foregoing path drawing interface may be a map display interface, and a map of the virtual environment is displayed in the map display interface, and the entry of the drawing interface may be a mini-map. FIG. 5 shows a schematic diagram of displaying a path drawing interface involved in an embodiment in the present disclosure. As shown in a part (a) of FIG. 5, in a virtual environment 50 displayed by the first terminal, the upper right corner includes a mini-map 51. For example, the virtual environment 50 may be a 3D game world, and the currently presented game screen may show a portion of the 3D game world based on a current location of a virtual object (e.g., a user controllable character) in the 3D game world. The mini-map 51 may show the current location of the virtual object in a local region of the 3D game world. As shown in a part (b) of FIG. 5, after detecting that the user taps the mini-map 51, the first terminal displays a full map 52 on an upper layer of the virtual environment 50, and an interface in which the full map 52 is located is the foregoing path drawing interface. The full map 52 may be a 2D representation of a full region of the 3D game world. In some embodiments, the full map 52 may display, besides terrain features of the 3D game world (e.g., roads, river, landmarks), other resources and objects in the 3D game world, such as representations of players (e.g., team members or enemies) and/or non-player controlled characters, functional legends, etc., to provide users with reference points of drawing a desirable path. In some embodiments, the disclosed terminal may allow the user to preset certain path finding conditions, such as avoiding crowded area (e.g., an area containing one type of objects whose quantity is greater than a preset threshold), avoiding certain landmarks, etc. When the terminal detects that the user-drawn path passes through a preset to-be-avoided area or landmark or an area impassable for the virtual object, the terminal may prompt the user to whether to make a detour, or directly make a detour when generating the path.

Step 401*b*: Obtain an operation track of a drawing operation performed in the path drawing interface.

After the first terminal displays the path drawing interface, the user may perform a drawing operation in the path drawing interface. Using an example in which the display interface of the virtual environment is displayed in a touch screen, the drawing operation may be a touch slide operation of a finger of the user in the path drawing interface.

To prevent the user from performing an incorrect operation in the path drawing interface, in some embodiments of the present disclosure, the first terminal may display a triggering control in the path drawing interface, and in a case that a predetermined operation on the triggering control is received, the first terminal controls the path drawing interface to enter a drawing-accepted state, and obtains an operation track of a drawing operation performed in the path drawing interface in the drawing-accepted state.

For example, in a case that the first terminal displays the path drawing interface, a triggering control is displayed in the path drawing interface. In a case that the triggering control does not receive a predetermined operation, the path drawing interface does not enter the drawing-accepted state. In this case, the first terminal does not detect the operation performed in the path drawing interface either, or the first terminal discards the drawing operation performed in the path drawing interface, to prevent the user from performing an incorrect operation. In a case that the user needs to autonomously plan a path, a predetermined operation (for example, a tapping operation) may be performed on the triggering control. Only in this case, the path drawing interface enters the drawing-accepted state. In a case that the path drawing interface is in the drawing-accepted state, the first terminal detects the drawing operation performed in the path drawing interface.

Figure 6:
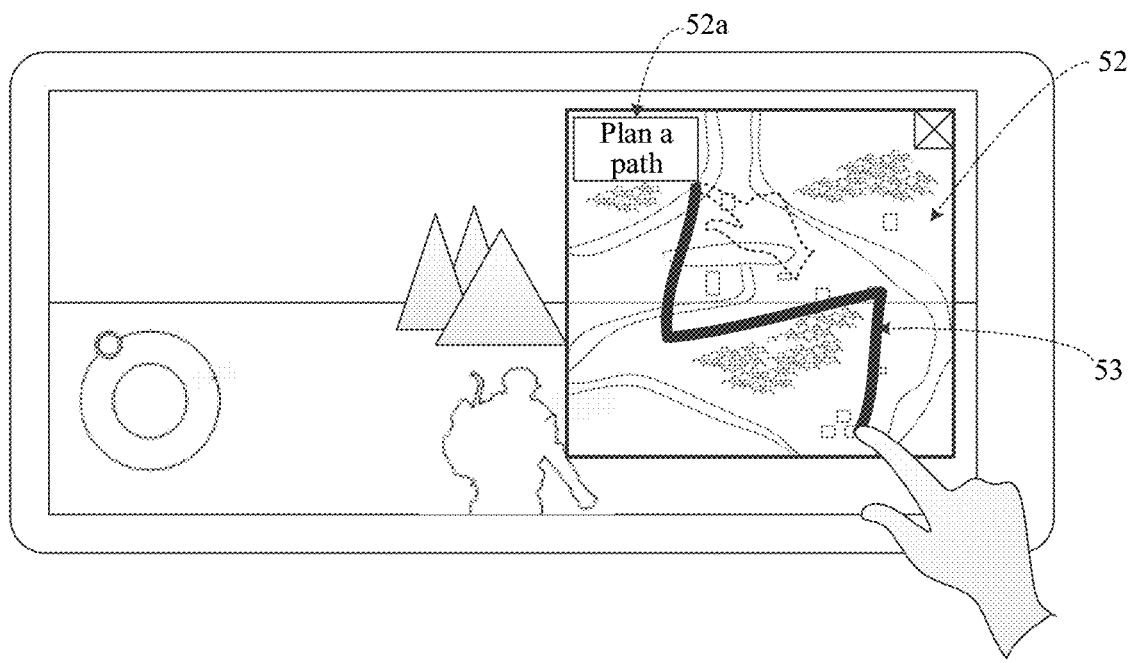
FIG. 6 is a schematic diagram of a drawing operation involved in the embodiment shown in FIG. 4.

FIG. 6 shows a schematic diagram of a drawing operation involved in an embodiment of the present disclosure. As shown in FIG. 6, on the basis on the part (b) in FIG. 5, a triggering control 52*a* is displayed at an upper left corner of the full map 52, and after detecting that the user taps the triggering control 52*a*, the first terminal controls the full map 52 to enter the drawing-accepted state. To improve the degree of recognition, in a case that the full map 52 enters the drawing-accepted state, the first terminal may display a special mark, for example, a bold frame, a highlighted frame, or an appearing text reminder. After the full map 52 enters the drawing-accepted state, the user may perform a touch slide operation in the full map 52, and after the first terminal detects the touch slide operation, an operation track 53 (that is, a touch slide track of the touch slide operation) of the touch slide operation may be obtained.

Figure 7:
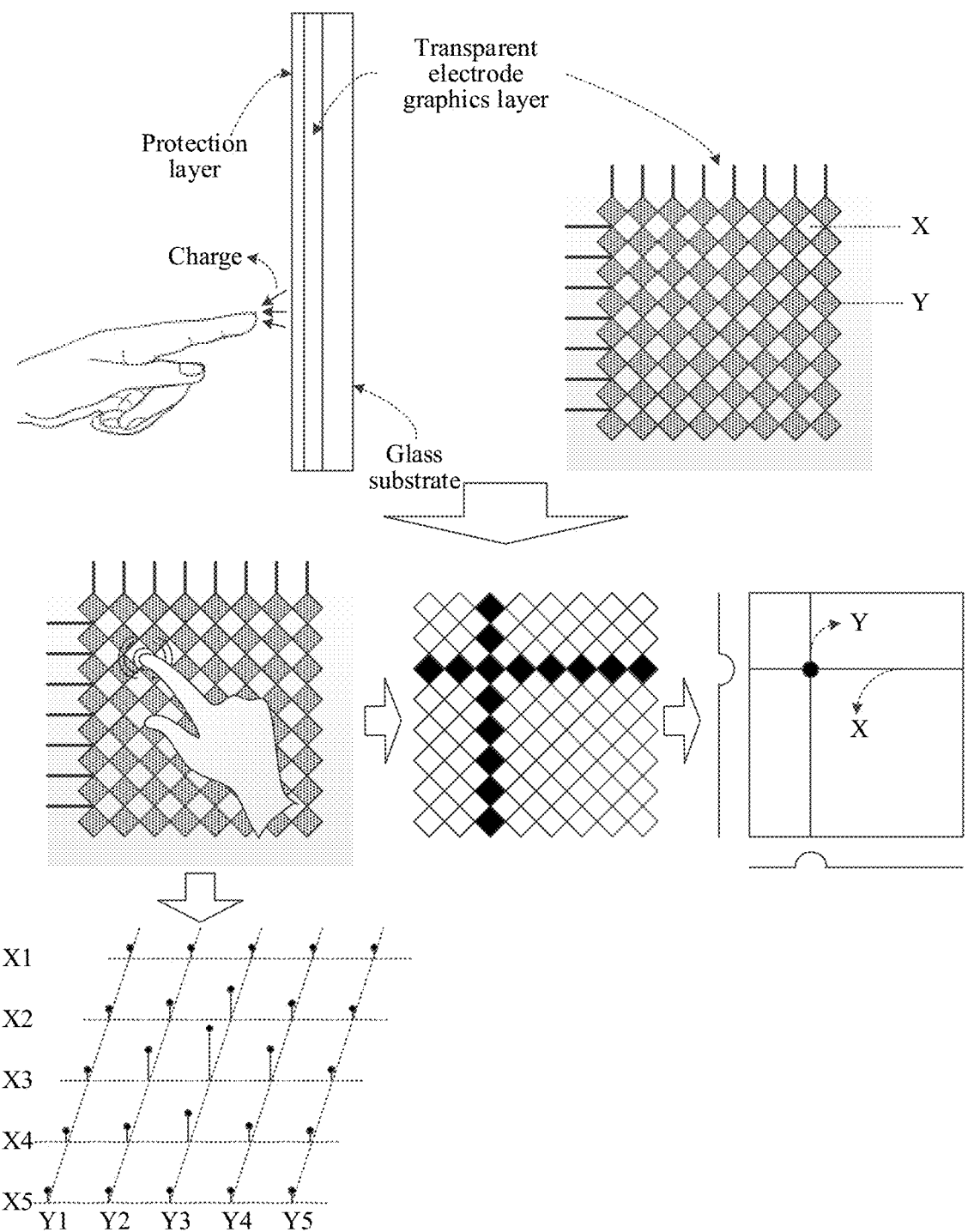
FIG. 7 is a schematic diagram of a mutual-capacitance touch screen involved in the embodiment shown in FIG. 4.

In an actual application, the first terminal may obtain the operation track of the touch slide operation by combining a hardware level and a program level, and a principle is as follows:

1. The Hardware Level:

FIG. 7 shows a schematic diagram of a mutual-capacitance touch screen involved in an embodiment of the present disclosure. As shown in FIG. 7, the mutual-capacitance touch screen may include a protection layer, a transparent electrode graphics layer, and a glass substrate, where the transparent electrode graphics layer has an upper indium tin oxide (ITO) conductive film and a lower ITO conductive film. Many electric charges are stored between the two layers of ITO conductive films. In a case that the finger of the user touches one point on the touch screen, a part of charges at locations corresponding to the point on the two layers of ITO conductive films are lost and transferred to the human body. In this case, a weak current is generated at the point, and electrodes representing a horizontal axis (an x axis) and electrodes representing a longitudinal axis (a y axis) are respectively distributed in the two layers of ITO conductive films, the two layers of ITO conductive films are mutually overlapped, to form a set of precise two-dimensional coordinate system, and the mutual-capacitance touch screen may position, by detecting the weak current, a point (that is, a touch point of the user) at which the charges are lost in the two-dimensional coordinate system.

2. The Program Level:

In a case that the touch point of the user is detected at the foregoing hardware level, a touch event is triggered in an operating system of the first terminal. The touch event in the operating system of the first terminal is triggered in a case that the user puts the finger on the screen, slides the finger on the screen, or removes the finger from the screen. There may be several types of touch events as follows:

touchstart event: this event is triggered in a case that a finger starts to touch the screen. Even if one finger has been put on the screen, the event may still be triggered in a case that another finger touches the screen.

touchmove event: this event is continuously triggered in a case that a finger slides on the screen. During the occurrence of this event, rolling may be prevented by invoking a preventDefault ( ) event.

touchend event: this event is triggered in a case that the finger is removed from the screen.

touchcancel event: this event is triggered in a case that a system stops touch tracking.

Each touch event further includes three attributes used for touch tracking:

touches: representing an array of Touch objects of a currently tracked touch operation.

targetTouches: representing an array of Touch objects specific to an event target.

changeTouches: representing an array of Touch objects that have changed since the last touch.

Each Touch object may include the following attributes:
clientX: an x coordinate of a touched target in a viewport.
clientY: a y coordinate of a touched target in a viewport.
identifier: the unique ID for identifying the touch.
pageX: an x coordinate of a touched target in a page.
pageY: a y coordinate of a touched target in a page.
screenX: an x coordinate of a touched target in a screen.
screenY: a y coordinate of a touched target in a screen.
Target: touched document object model (DOM) node target.

Figure 8:
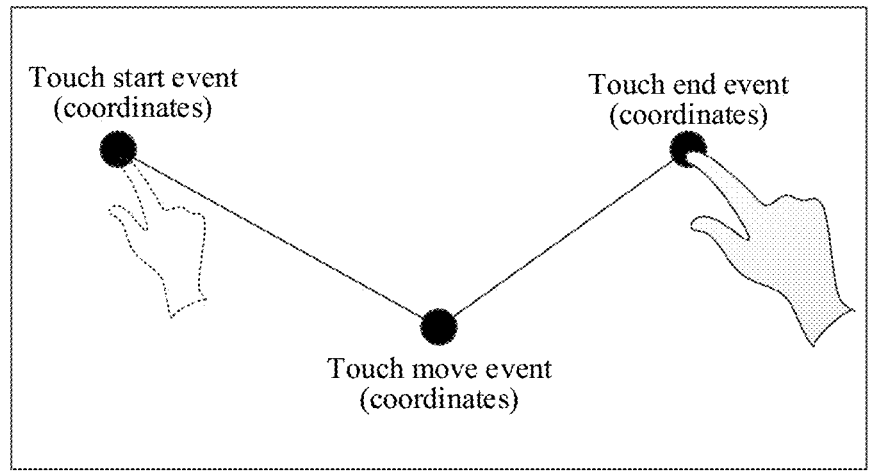
FIG. 8 is a schematic diagram of determining an operation track according to a touch event involved in the embodiment shown in FIG. 4.

The application program in the first terminal may obtain, through the touch events obtained at the foregoing program level, the operation track of the drawing operation performed in the path drawing interface. For example, FIG. 8 shows a schematic diagram of determining an operation track according to touch events involved in an embodiment of the present disclosure. As shown in FIG. 8, the first terminal may obtain, according to coordinates respectively corresponding to a touch start event, a touch end event, and a touch move event between the touch start event and the touch end event, an operation track of a drawing operation performed in the path drawing interface.

Step 401*c*: Sample the operation track according to a preset sampling rule to obtain the location information of the at least three operating points, the at least three operating points include a starting point, an endpoint, and at least one middle point of the operation track.

The foregoing operation track is formed by location information of several operating points. To reduce a calculation amount in a subsequent processing process, in some embodiments of the present disclosure, the first terminal obtains, through sampling, at least three operating points in the several operating points forming the operation track, where the at least three operating points include a starting point, an endpoint, and at least one middle point of the operation track.

A larger quantity of the at least three operating points indicates a higher matching degree between a connecting line of the at least three operating points and the foregoing operation track, and a higher matching degree between a subsequently generated moving path and the operation track. Therefore, to ensure that a subsequently generated moving path can sufficiently match the operation track, the foregoing collected at least three operating points need to be capable of restoring a general outline of the operation track, that is, the at least three operating points need to satisfy a certain quantity requirement.

In a possible implementation, in a case that the location information of the at least three operating points is obtained, through sampling, in the operation track according to a preset sampling rule, the first terminal may obtain, through sampling, the foregoing at least three operating points in the several operating points according to a fixed sampling rate. For example, using an example in which the sampling rate is one twentieth, the first terminal may first collect the starting point and the endpoint of the operation track, and obtains, through sampling, one operating point form each twenty operating points in the operating points except the starting point and the endpoint in the operation track, and finally uses the starting point, the endpoint, and the one operating point obtained, through sampling, from each twenty operating points of the operation track as the foregoing at least three operating points.

In a case that the first terminal performs sampling in the several operating points according to the fixed sampling rate, operating points except the starting point and the endpoint in the several operating points may be arranged according to a sequence in the operation track, and the operating points after the arrangement are sampled according to the fixed sampling rate. Using an example in which the sampling rate is one twentieth, in a possible sampling manner, the first terminal may use one operating point located in a predetermined location in each twenty operating points after the arrangement as an operating point obtained through sampling. For example, the first terminal may use the last operating point in each twenty operating points as the operating point obtained through sampling. Alternatively, in another possible sampling manner, the first terminal may use a random operating point in each twenty operating points after the arrangement as the operating point obtained through sampling.

In another possible implementation, in a case that the location information of the at least three operating points is obtained through sampling in the operation track according to a preset sampling rule, the first terminal may divide the operation track into at least two track segments and obtain respective curvatures of the at least two track segments; and obtain respective corresponding sampling rates of the at least two track segments according to the respective curvatures of the at least two track segments, and sample the at least two track segments respectively according to the respective corresponding sampling rates of the at least two track segments, to obtain the location information of the at least three operating points.

An operation track with a smaller curvature indicates a smaller quantity of operating points required to restore the operation track. For example, in a case that one operation track is a straight line, only two operating points are required to restore the operation track. Correspondingly, an operation track with a larger curvature indicates a larger quantity of operating points required to restore the operation track. In an actual application, in most situations, the operation track of the drawing operation of the user is not a straight line but complex and variable. To generate a moving path matching the operation track as much as possible by using operating points as fewer as possible, in some embodiments of the present disclosure, the operation track may be divided into at least two track segments, and a corresponding sampling rate is determined according to a curvature of each track segment. In some embodiments of the present disclosure, the curvature of the track segment represents the smoothness of the track segment, and a smaller curvature of the track segment indicates the smoother track segment, and the curvature of the track segment is in direct proportion to the corresponding sampling rate of the track segment. That is, a larger curvature of the track segment indicates a higher corresponding sampling rate of the track segment.

Figure 9:
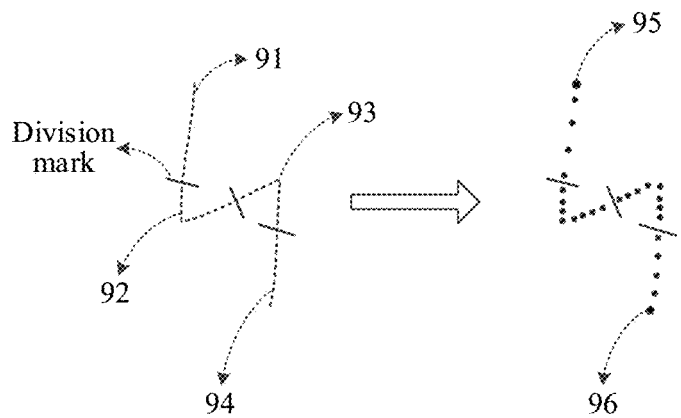
FIG. 9 is a schematic diagram of collecting operating points involved in the embodiment shown in FIG. 4.

For example, FIG. 9 shows a schematic diagram of collecting operating points involved in an embodiment of the present disclosure. The operation track shown in FIG. 6 is used as an example, and the first terminal may divided an operation track 90 into a track segment 91, a track segment 92, a track segment 93, and a track segment 94 (division is performed according to division marks in FIG. 9, where the division marks are marks introduced for ease of understanding), where curvatures of the track segment 91 and the track segment 94 are relatively small (close to 0), and corresponding sampling rates are relatively low. In FIG. 9, in addition to a starting point 95 and an endpoint 96, the first terminal respectively obtains three operating points through sampling in the track segment 91 and the track segment 94. However, the curvatures of the track segment 92 and the track segment 93 are relatively large, and corresponding sampling rates are relatively high. In FIG. 9, the first terminal respectively obtains eight operating points through sampling in the track segment 92 and the track segment 93.

Step 401d: Generate a first instruction including the location information of the at least three operating points on the operation track of the drawing operation.

After the first terminal obtains the location information of the at least three operating points through sampling, a first instruction including the location information obtained through sampling may be generated, to trigger a subsequent path generating step.

Step 402: Generate a moving path according to the location information of the at least three operating points on the operation track of the drawing operation.

After obtaining the foregoing first instruction, the first terminal may generate, according to the location information of the operating points included in the first instruction and the corresponding location points of the operating points in a virtual environment, a path for controlling the movement of the virtual object.

Optionally, in a case that a moving path is generated according to the location information of the at least three operating points on the operation track of the drawing operation, the first terminal obtains at least three location points in the virtual environment respectively corresponding to the location information of the at least three operating points, generates sub-paths between each two adjacent location points in the at least three location points by using a preset path generating algorithm according to passable location points in the virtual environment, and joins the sub-paths between each two adjacent location points in the at least three location points together to form a moving path.

In an embodiment of the present disclosure, the first terminal may determine a corresponding location point of each operating point in the at least three operating points in the virtual environment according to the location information of the at least three operating points included in the first instruction, to obtain a same quantity of at least three location points, determine sub-paths between each two adjacent location points according to passable location points in the virtual environment, and then use a complete path formed by the sub-paths between each two adjacent location points as a final moving path.

In a case that sub-paths between each two adjacent location points in the at least three location points are generated, the first terminal may generate the sub-paths according to a preset path generating algorithm. For example, the first terminal may generate sub-paths between each two adjacent location points by using an A-star algorithm.

The A-star algorithm is also referred to as an A* search algorithm, which is an algorithm for obtaining a lowest passing cost from paths of a plurality of nodes on an image plane, and is often used for movement computation of a player character (PC) in a game, or movement computation of a robot in an online game. The A-star algorithm divides a path finding region into a plurality of connected polygonal meshes (for example, triangular meshes), each polygonal mesh is a path finding node, and navigation mesh path finding from a starting point to a target point is to find mesh paths that need to be passed from a mesh in which the starting point is located to a mesh in which the target point is located. A list of navigation mesh paths that need to be passed from the starting point to the target point may be obtained through calculation by using the A-star algorithm, and after the list of navigation mesh paths that need to be passed is obtained, a list of passed path points is calculated, and a path finding path is finally determined by connecting the path points. Each two adjacent location points are used as the starting point and the target point, and a path finding path obtained by using the A-star algorithm is a subpath between the two adjacent location points.

Optionally, before sub-paths between each two adjacent location points in the at least three location points are generated according to a preset path generating algorithm, the first terminal further detects whether a target location point is an effective location point, where the target location point is any location point in the at least three location points, and the effective location point is a location point accessible to the virtual object; in a case that the target location point is not an effective location point, determines a first effective location point, where the first effective location point is an effective location point closest to the target location point other than the foregoing at least three location points; determines whether a distance between the target location point and the first effective location point is less than a preset distance threshold; in a case that the distance between the target location point and the first effective location point is less that the preset distance threshold, replaces the target location point with the first effective location point; and in a case that the distance between the target location point and the first effective location point is not less than the preset distance threshold, removes the target location point from the at least three location points.

The preset distance threshold may be preset by a developer of an application program corresponding to the virtual environment.

In an actual application, some location points inaccessible to the virtual object (that is, some impassable location points) may exist in the virtual environment. For example, some location points in some virtual environments may be located in water or on a mountain, and in a case that one location point inaccessible to the virtual object exists in the at least three location points, there is no path finding path from a previous location point of the inaccessible location point to the inaccessible location point in the at least three location points. In this case, the at least three location points need to be adjusted, and an adjustment manner may be: replacing the inaccessible location point with a nearest accessible location point in a preset range, and in a case that there is no accessible location point in the preset range, the inaccessible location point may be directly removed from the at least three location points.

Figure 10:
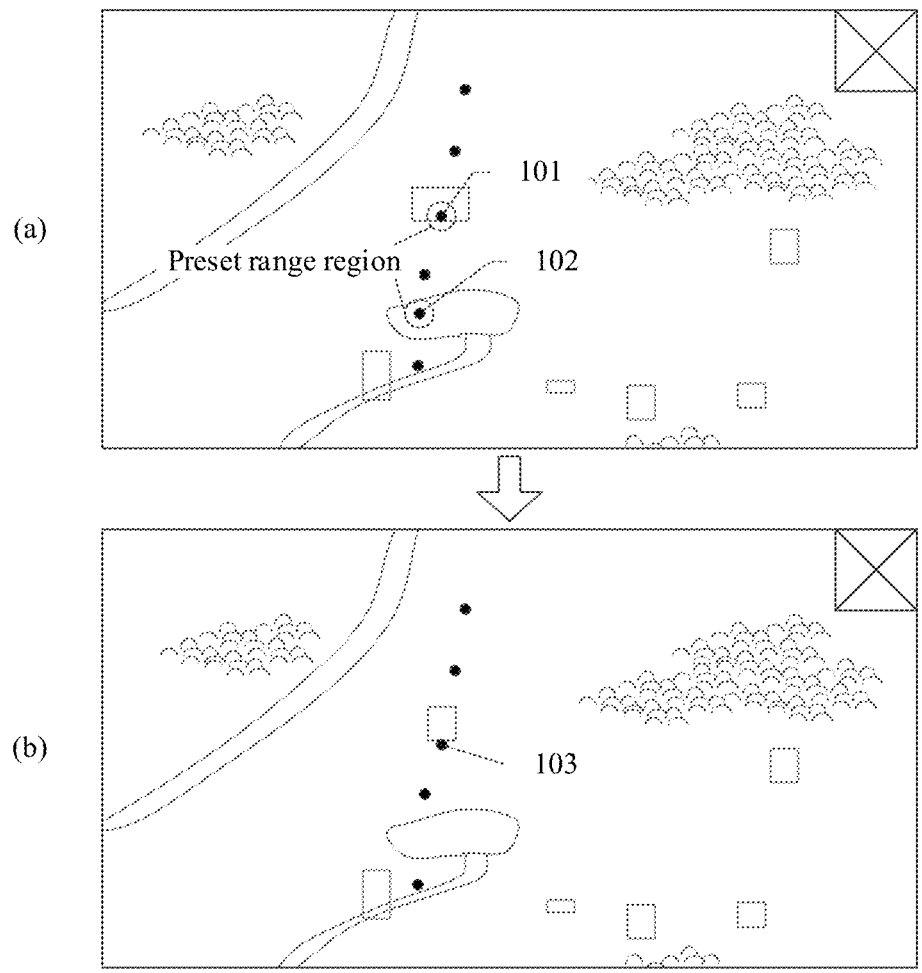
FIG. 10 is a schematic diagram of adjusting location points involved in the embodiment shown in FIG. 4.

For example, FIG. 10 shows a schematic diagram of adjusting location points involved in an embodiment of the present disclosure. As shown in a part (a) of FIG. 10, several location points corresponding to the collected operating points exist in the virtual environment, and a location point 101 and a location point 102 are not effective location points, where other effective location points exist within a preset range region around the location point 101, and no other effective location point exists within a preset range region around the location point 102. In this case, the first terminal adjusts the location point 101 and the location point 102. As shown in a part (b) of FIG. 10, the first terminal replaces the location point 101 by using an effective location point 103 closest to the location point 101, and removes the location point 102.

Optionally, before the moving path is generated according to the location information of the at least three operating points on the operation track of the drawing operation, the first terminal further obtains the quantity of effective points in the at least three operating points, where location points in the virtual environment corresponding to the effective points are location points accessible to the virtual object. In a case that a ratio of the quantity of effective points to a quantity of the at least three operating points is higher than a preset value, the first terminal performs the step of generating a moving path according to the location information of the at least three operating points on the operation track of the drawing operation.

In an embodiment of the present disclosure, before generating the moving path, the first terminal may detect whether the operation track of the drawing operation of the user satisfies a condition, and only in a case that the operation track satisfies the condition, the step of generating a moving path may be performed. In a possible implementation, in a case that the first terminal detects whether the operation track of the drawing operation of the user satisfies the condition, a ratio of the quantity of effective points in the foregoing at least three operating points to a quantity of the at least three operating points may be calculated. Only in a case that the ratio is greater than a preset value, for example, greater than 95%, it is considered that the operation track of the drawing operation of the user satisfies the condition; otherwise, it may be considered that the operation track of the drawing operation of the user does not satisfy the condition.

In a possible implementation, after the first terminal generates the moving path, a matching degree between the moving path and the operation track of the drawing operation of the user may be calculated, and in a case that the matching degree is higher than a preset matching degree threshold (the preset matching degree threshold may be preset by a developer), a step of controlling the virtual object to move may be performed.

In an embodiment of the present disclosure, the first terminal may obtain a line drawing of the moving path and obtain a line drawing of the operation track of the drawing operation; and then calculate a similarity between the two line drawings, and use the similarity between the two line drawings as the matching degree between the moving path and the operation track of the drawing operation of the user.

Optionally, after the foregoing moving path is generated, the first terminal further displays the foregoing generated moving path in a path drawing interface.

Step 403: Control a virtual object to move along the moving path in a virtual environment.

After the foregoing moving path is obtained, the user does not need to perform a control operation again, and the first terminal may automatically control the virtual object to move along the foregoing moving path in the virtual environment.

Based on the above, according to the solution shown in some embodiments of the present disclosure, the first instruction (including the location information of the at least three operating points on the operation track of the drawing operation performed by the user in the path drawing interface) triggered by a slide drawing operation performed by the user in the path drawing interface is obtained, a moving path is generated according to the location information of the at least three operating points, and the virtual object is controlled to move along the moving path in the virtual environment, where the moving path may be flexibly set by the user according to an actual requirement, so that control over the moving path of the automatic path finding of the virtual object is more diversified, thereby improving an effect of controlling the virtual object in the virtual environment.

In addition, according to the solution shown in some embodiments of the present disclosure, in a case that the first instruction is obtained, the at least three operating points are obtained by sampling the operation track of the slide drawing operation, and a moving path is generated according to at least three location points in the virtual environment corresponding to the at least three operating points obtained through sampling. In this way, a calculation amount of generating a moving path is simplified, and efficiency of generating a moving path is improved.

In addition, according to the solution shown in some embodiments of the present disclosure, in a case that a moving path is generated according to at least three location points in the virtual environment corresponding to the at least three operating points obtained through sampling, location points inaccessible to the virtual object in the at least three location points are adjusted, to improve a success rate of generating a moving path.

According to the solution shown in FIG. 4, in a case that the first terminal controls the virtual object to move, the path drawing interface may be displayed, and in a case that a drawing operation performed in the path drawing interface is obtained, the moving path is displayed in the path drawing interface, where the moving path is a path generated according to the operation track of the drawing operation, and the virtual object is controlled to move along the moving path in the virtual environment.

Figure 11:
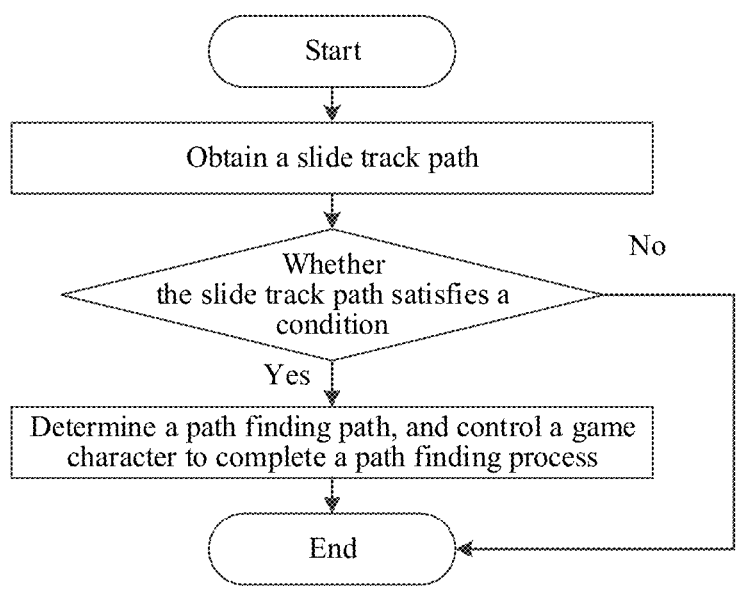
FIG. 11 is a schematic flowchart of automatic path finding shown according to an exemplary embodiment of the present disclosure.

The solution shown in FIG. 4 may be applied to a game scene in which an automatic path finding function in a game is combined with a drawn line or a drawn graphic, so that the user may cause the game character to move along a path planned by the user in a moving process. For example, FIG. 11 shows a schematic flowchart of automatic path finding according to an embodiment of the present disclosure. As shown in FIG. 11, the user may plan a path by performing a touch slide operation in a map region of a game. After a processor of the terminal collects a touch event corresponding to the touch slide operation, a path finding instruction is obtained according to a slide track of the user on the game map, where the path finding instruction includes location information of a starting point, an endpoint, and a detailed path point (that is, at least one middle point). The terminal determines whether the location information (that is, the slide track path) indicated by the path finding instruction satisfies a condition. In a case that the condition is satisfied, the terminal determines a path finding path (that is, the foregoing moving path) of the game character in a map of a game scene according to the location information indicated by the path finding instruction and data of a walkable region in the game, and controls the game character to automatically complete the path finding process from a starting point of the path (a triggered starting point) to an endpoint of the path (a triggered endpoint) according to the path finding path, and the path finding process is finished in a case that the location information indicated by the path finding instruction does not satisfy the condition.

Figure 12:
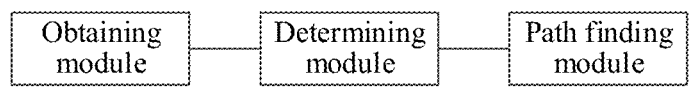
FIG. 12 is an infrastructural diagram of execution modules of automatic path finding shown according to an exemplary embodiment of the present disclosure.

FIG. 12 shows an infrastructural diagram of execution modules of automatic path finding according to an embodiment of the present disclosure. As shown in FIG. 12, the foregoing process may be completed by an obtaining module, a determining module, and a path finding module in a terminal, where the obtaining module performs the foregoing step of obtaining a path finding instruction, the determining module performs the foregoing step of determining whether the location information (that is, the slide track path) indicated by the path finding instruction satisfies the condition, and the path finding module performs the foregoing step of determining the path finding path of the game character in a map of a game scene according to the location information indicated by the path finding instruction and date of the walkable region in the game, and controlling the path finding process of the game character.

In a possible implementation, after generating a moving path according to the solution in the embodiment shown in FIG. 4, the first terminal may transmit path instructing information to a second terminal, where the path instructing information is used for instructing the second terminal to control a virtual object corresponding to the second terminal to move along the moving path in the virtual environment. For example, the moving path generated by the first terminal may be displayed by the second terminal, and after a user corresponding to the second terminal selects the moving path, the second terminal controls a virtual object in the second terminal to move along the moving path.

Correspondingly, the first terminal may similarly receive path instructing information transmitted by another terminal, and in a case that a user corresponding to the first terminal selects a moving path generated by the another terminal and indicated by the path instructing information, the second terminal may also control the virtual object to move along the moving path generated by the another terminal.

Figure 13:
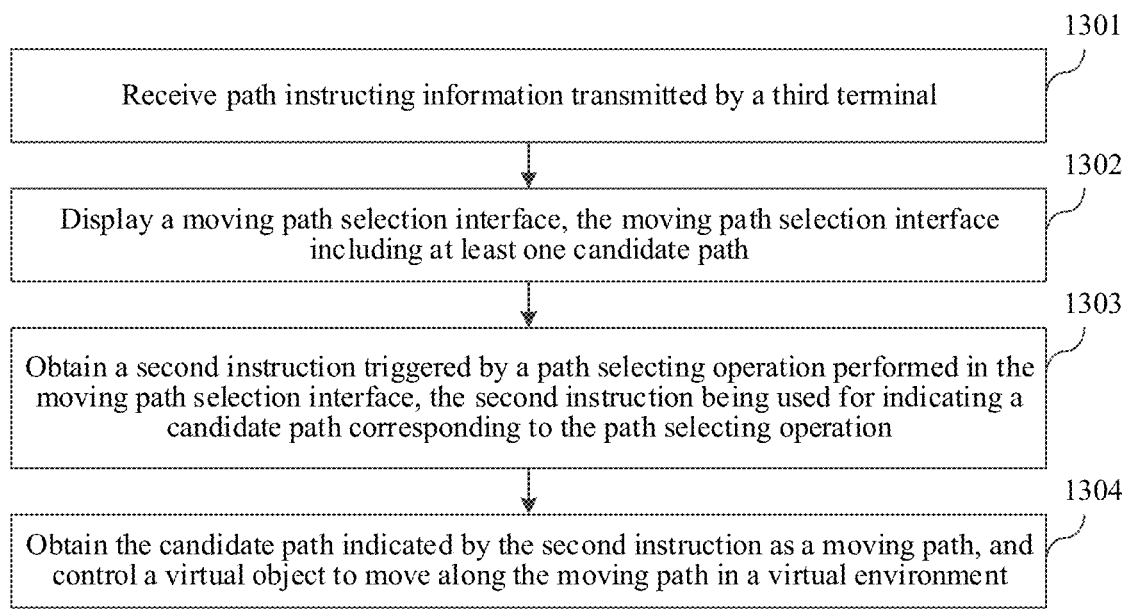
FIG. 13 is a flowchart of a virtual object control method according to an exemplary embodiment of the present disclosure.

FIG. 13 shows a flowchart of a virtual object control method according to an exemplary embodiment of the present disclosure, and the method may be applied to a first terminal. Using an example in which the second terminal may also control the virtual object to move along the moving path generated by the another terminal, the virtual object control method may include the following steps:

Step 1301: Receive path instructing information transmitted by a third terminal.

The path instructing information is used for indicating some or all candidate paths in the at least one candidate path, and the candidate path indicated by the path instructing information is a path generated by the third terminal according to an operation track of a drawing operation performed by the user in a path drawing interface displayed by the third terminal.

The third terminal may generate some or all candidate paths in the foregoing at least one candidate path according to the method, for generating a moving path according to the operation track of the drawing operation performed by the user in the path drawing interface.

Step 1302: Display a moving path selection interface, the moving path selection interface including at least one candidate path.

In an embodiment of the present disclosure, in a case that the foregoing path instructing information is used for indicating some candidate paths in the at least one candidate path, other candidate paths in the at least one candidate path may be candidate paths generated by the first terminal according to the method, shown in FIG. 4, for generating a moving path according to the operation track of the drawing operation performed by the user in a path drawing interface; or the foregoing other candidate paths may be candidate paths indicated by another terminal other than the third terminal by using path instructing information.

Step 1303: Obtain a second instruction triggered by a path selecting operation performed in the moving path selection interface, the second instruction being used for indicating a candidate path corresponding to the path selecting operation.

In an embodiment of the present disclosure, the user may select one candidate path from candidate paths generated according to the operation track of the drawing operation performed in the path drawing interface, and in a case that the first terminal receives the path selecting operation of the user, a second instruction used for indicating a candidate path corresponding to the path selecting operation may be generated.

Step 1304: Obtain the candidate path indicated by the second instruction as a moving path, and control a virtual object to move along the moving path in a virtual environment.

Based on the above, according to the solution shown in some embodiments of the present disclosure, the second instruction (indicating a candidate path corresponding to the path selecting operation) triggered by the path selecting operation performed by the user in the path selection interface is obtained, the candidate path indicated by the second instruction is obtained as a moving path, and the virtual object is controlled to move along the moving path in the virtual environment, where the moving path may be flexibly set by the user according to an actual requirement, so that control over the moving path of the automatic path finding of the virtual object is more diversified, thereby improving an effect of controlling the virtual object in the virtual environment.

According to the solution shown in FIG. 13, the first terminal may display a moving path selection interface, the moving path selection interface includes at least one candidate path, and the candidate path is a path generated according to the operation track of the drawing operation performed by the user in a path drawing interface. In a case that a path selecting operation performed in the moving path selection interface is obtained, the first terminal controls the virtual object to move along the moving path in the virtual environment, the moving path being a candidate path corresponding to the path selecting operation.

The foregoing moving path selection interface and the path drawing interface may be the same interface. For example, the moving path selection interface and the path drawing interface may both be a map display interface.

Figure 14:
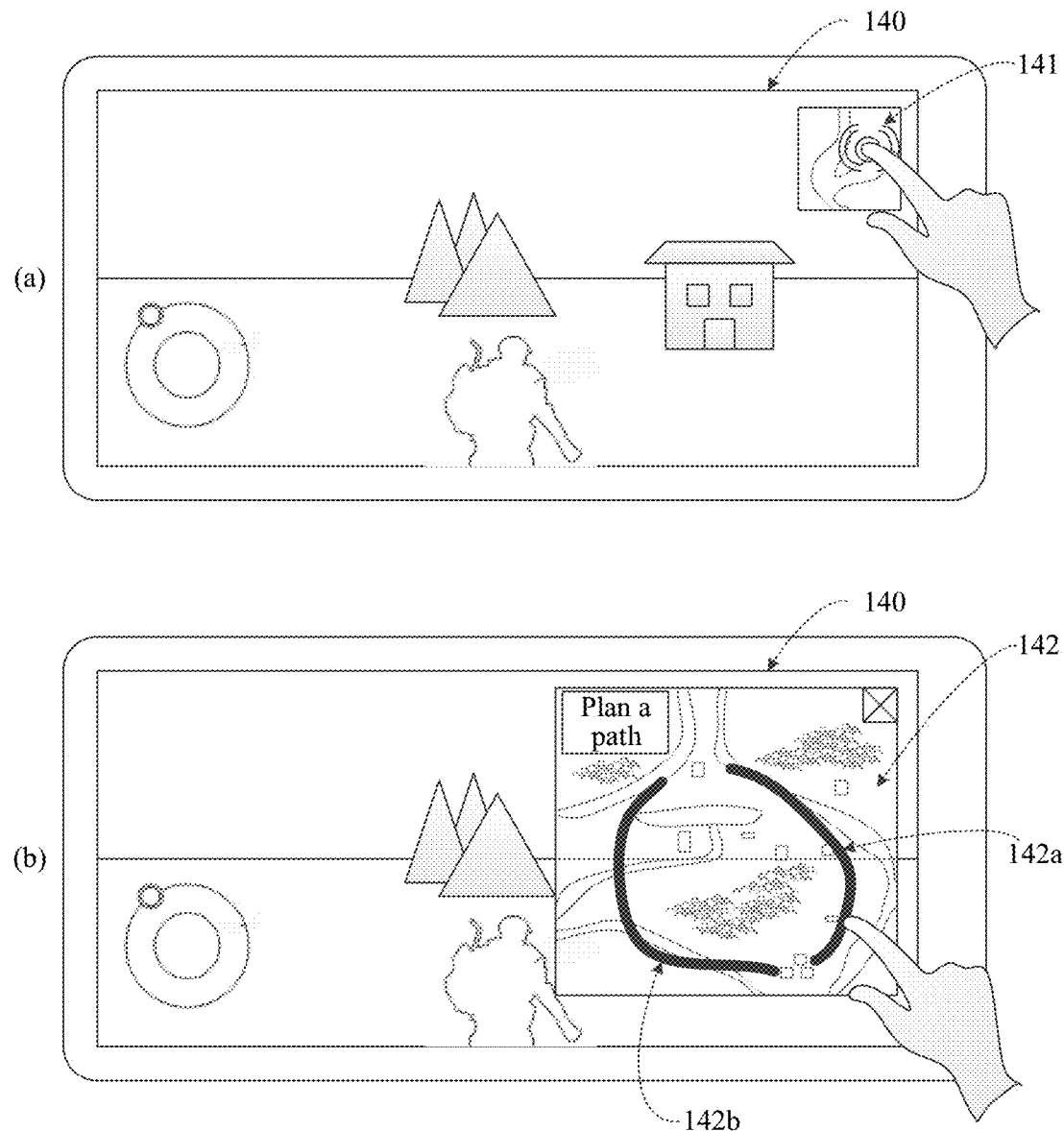
FIG. 14 is a schematic diagram of an operation of selecting a moving path according to an exemplary embodiment of the present disclosure.

FIG. 14 shows a schematic diagram of an operation of selecting a moving path according to an exemplary embodiment of the present disclosure. As shown in a part (a) of FIG. 14, in a virtual environment 140 displayed by the first terminal, the upper right corner includes a mini-map 141. After the user taps the mini-map 141, the first terminal displays a full map 142 on an upper layer of the virtual environment 140, a, and the full map 142 is the foregoing moving path selection interface. In addition the map content, the full map 142 further includes at least one moving path (a moving path 142a and a moving path 142b are shown in FIG. 14) generated and indicated by the third terminal. In a case that the user taps the moving path 142a, the first terminal controls the virtual object to move along the moving path 142a in the virtual environment; and correspondingly, in a case that the user taps the moving path 142b, the first terminal controls the virtual object to move along the moving path 142b in the virtual environment.

For example, in one online game scene, a user a teams up with a user b to play the game, and the user a may plan a moving path through a touch slide operation in a map region. After the user a and the user b selects the moving path, terminals respectively corresponding to the user a and the user b may respectively control game characters of the user a and the user b to move along the planned moving path in the game scene. Alternatively, the user a may plan two or more candidate paths through the touch slide operation in the map region, and after the user a and the user b select respective candidate paths as respective moving paths, terminals respectively corresponding to the user a and the user b may respectively control the game characters of the user a and the user b to move along the respectively selected moving paths in the game scene.

This solution is to be widely applied to games such as an arena survival game in which frequent running operations are required. By replacing the foregoing manner in which path finding can be performed by only setting one single target location with a manner in which movement can be performed by setting special paths, the experience of automatic path finding of the player can be remarkably improved, and more game fun can be provided.

Figure 15:
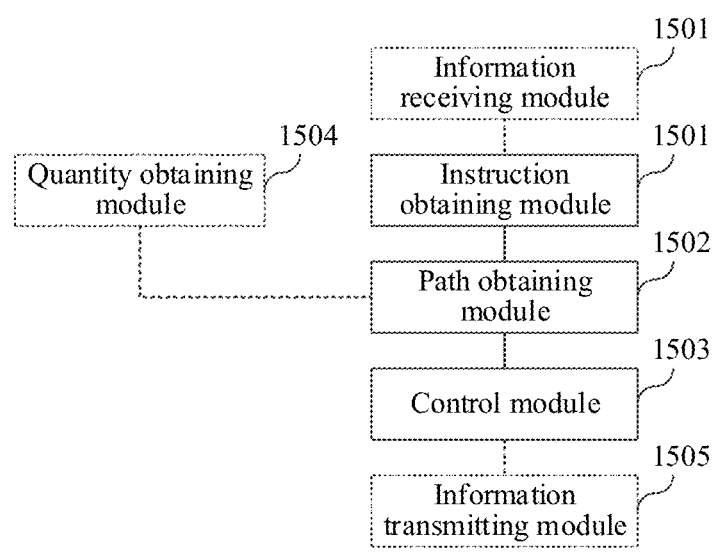
FIG. 15 is a structural block diagram of a virtual object control apparatus according to an exemplary embodiment of the present disclosure.

FIG. 15 is a structural block diagram of a virtual object control apparatus shown according to an exemplary embodiment. The virtual object control apparatus may be applied to a terminal, to perform all or some steps of the method shown in any embodiment of FIG. 3, FIG. 4, or FIG. 13. The virtual object control apparatus may include:

an instruction obtaining module 1501, configured to obtain a path finding instruction;

a path obtaining module 1502, configured to obtain a moving path according to the path finding instruction, the moving path being a path generated according to an operation track of a drawing operation performed in a path drawing interface, the path drawing interface including a map of a virtual environment, and the drawing operation being a slide drawing operation performed on the map of the virtual environment; and a control module 1503, configured to control a virtual object to move along the moving path in the virtual environment.

Optionally, the instruction obtaining module 1501 is specifically configured to:

obtain a first instruction triggered by the drawing operation, the first instruction including location information of at least three operating points on the operation track of the drawing operation; and the path obtaining module 1502 is specifically configured to:

generate the moving path according to the location information of the at least three operating points on the operation track of the drawing operation.

Optionally, in a case that the first instruction triggered by the drawing operation is obtained, the instruction obtaining module 1501 is specifically configured to:

display the path drawing interface;

obtain the operation track of the drawing operation performed in the path drawing interface;

sample the operation track according to a preset sampling rule to obtain the location information of the at least three operating points, the at least three operating points including a starting point, an endpoint, and at least one middle point of the operation track; and generate the first instruction including the location information of the at least three operating points on the operation track of the drawing operation.

Optionally, in a case that the operation track is sampled according to a preset sampling rule to obtain the location information of the at least three operating points, the instruction obtaining module 1501 is specifically configured to:

divide the operation track into at least two track segments;

obtain respective curvatures of the at least two track segments;

obtain respective corresponding sampling rates of the at least two track segments according to the respective curvatures of the at least two track segments; and sample the at least two track segments respectively according to the respective corresponding sampling rates of the at least two track segments, to obtain the location information of the at least three operating points.

Optionally, in a case that the moving path is generated according to the location information of the at least three operating points on the operation track of the drawing operation, the path obtaining module 1502 is specifically configured to:

obtain at least three location points respectively corresponding to the location information of the at least three operating points in the virtual environment;

generate sub-paths between each two adjacent location points in the at least three location points according to a preset path generating algorithm; and join the sub-paths between each two adjacent location points in the at least three location points together to form the moving path.

Optionally, before sub-paths between each two adjacent location points in the at least three location points are generated according to a preset path generating algorithm, the path obtaining module 1502 is further specifically configured to:

detect whether a target location point is an effective location point, the target location point being any location point in the at least three location points, and the effective location point being a location point accessible to the virtual object;

in a case that the target location point is not an effective location point, determine a first effective location point, the first effective location point being an effective location point closest to the target location point other than the at least three location points;

determine whether a distance between the target location point and the first effective location point is less than a preset distance threshold;

in a case that a distance between the target location point and the first effective location point is less than the preset distance threshold, replace the target location point with the first effective location point; and in a case that a distance between the target location point and the first effective location point is not less than the preset distance threshold, remove the target location point from the at least three location points.

Optionally, the apparatus further includes:

a quantity obtaining module 1504, configured to obtain, before the path obtaining module 1502 generates a moving path according to the location information of the at least three operating points on the operation track of the drawing operation, a quantity of effective points in the at least three operating points, a location point in the virtual environment corresponding to the effective point being a location point accessible to the virtual object; and the path obtaining module 1502 is specifically configured to:

in a case that a ratio of the quantity of the effective points to a quantity of the at least three operating points is greater than a preset value, perform the operation of generating the moving path according to the location information of the at least three operating points on the operation track of the drawing operation.

Optionally, the apparatus further includes:

an information transmitting module 1505, configured to transmit path instructing information to a second terminal, the path instructing information being used for instructing the second terminal to control a virtual object corresponding to the second terminal to move along the moving path in the virtual environment.

Optionally, the instruction obtaining module 1501 is specifically configured to:

display a moving path selection interface, the moving path selection interface including at least one candidate path; and obtain a second instruction, the second instruction being an instruction triggered by a path selecting operation performed in the moving path selection interface, and the second instruction being used for indicating a candidate path corresponding to the path selecting operation; and the path obtaining module 1502 is specifically configured to:

obtain the candidate path corresponding to the path selecting operation indicated by the second instruction as the moving path.

Optionally, the apparatus further includes:

an information receiving module 1506, configured to receive, before the instruction obtaining module 1501 displays the moving path selection interface, path instructing information transmitted by a third terminal, the path instructing information being used for indicating some or all candidate paths in the at least one candidate path, and the candidate path indicated by the path instructing information being a path generated by the third terminal according to the operation track of the drawing operation performed by the user in the path drawing interface.

Based on the above, according to the apparatus provided in some embodiments of the present disclosure, in a case that an application program is run on a terminal and a virtual environment is generated and displayed, the terminal may obtain, in response to receiving a path finding instruction, a moving path according to the path finding instruction, and control the virtual object to move along the moving path in the virtual environment. In this process, the moving path obtained by the terminal is a path generated according to an operation track of a slide drawing operation performed by the user in a path drawing interface including a map of the virtual environment. That is, the user may indicate a subsequent moving path of automatic path finding of a virtual object in a virtual environment by performing a slide drawing operation on the map of the virtual environment and using the slide track, and the moving path may be flexibly set by the user according to an actual requirement, so that control over the moving path of the automatic path finding of the virtual object is more diversified, thereby improving an effect of controlling the virtual object in the virtual environment.

Figure 16:
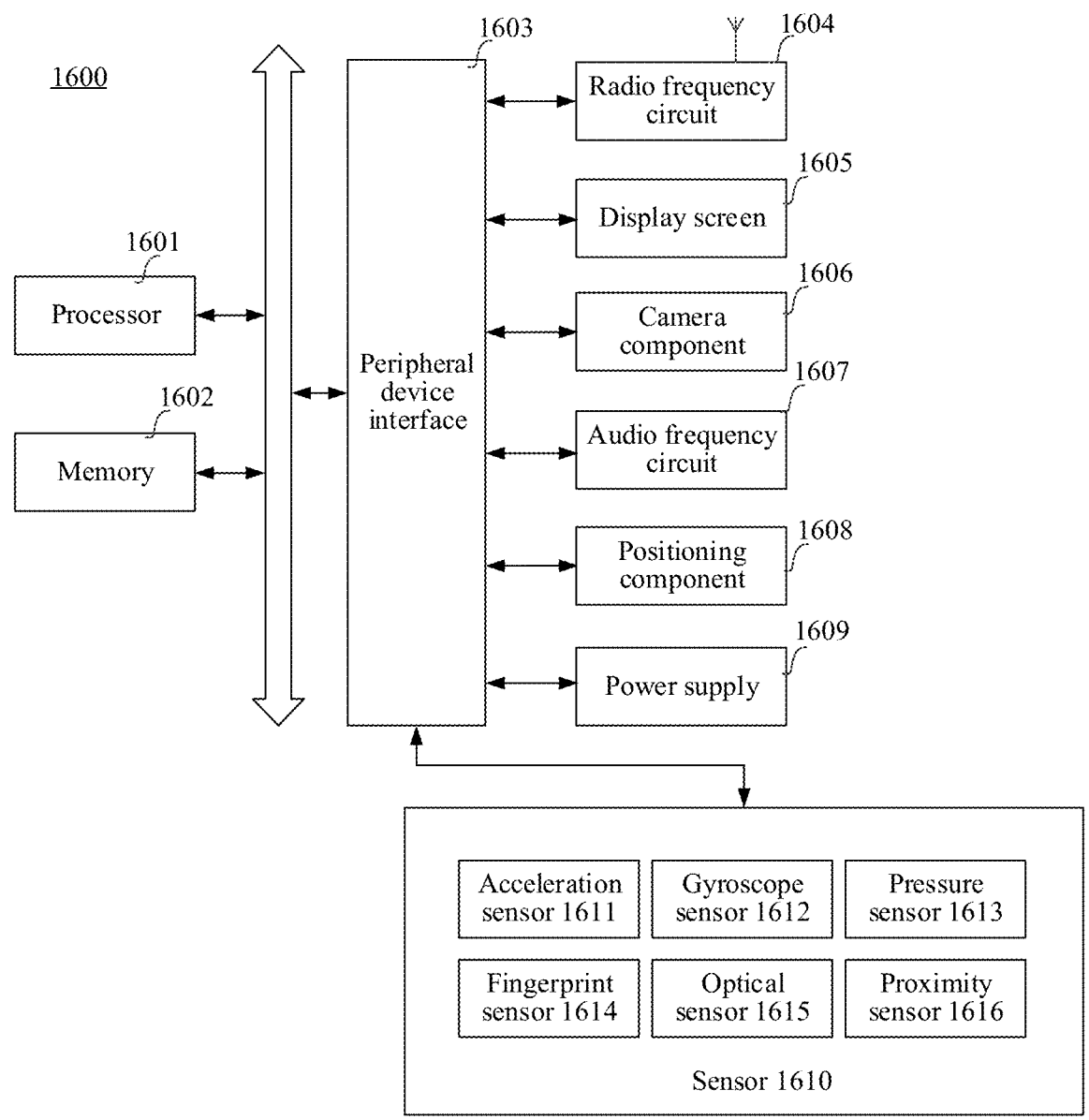
FIG. 16 is a structural block diagram of a computer device according to an exemplary embodiment of the present disclosure.

FIG. 16 is a structural block diagram of a computer device 1600 shown according to an exemplary embodiment. The computer device 1600 may be a user terminal, such as a smartphone, a tablet computer, a moving picture experts group audio layer III (MP3) player, a moving picture experts group audio layer IV (MP4) player, a notebook computer, or a desktop computer. The computer device 1600 may also be referred to as another name such as user equipment, a portable terminal, a laptop terminal, or a desktop terminal.

Generally, the computer device 1600 includes a processor 1601 and a memory 1602.

The processor 1601 may include one or more processing cores, for example, a 4-core processor or an 8-core processor. The processor 1601 may be implemented by at least one hardware form of a digital signal processor (DSP), a field-programmable gate array (FPGA), and a programmable logic array (PLA). The processor 1601 may alternatively include a main processor and a coprocessor. The main processor is configured to process data in an awake state, also referred to as a central processing unit (CPU), and the coprocessor is a low-power processor configured to process data in an idle state. In some embodiments, the processor 1601 may be integrated with a graphics processing unit (GPU). The GPU is responsible for rendering and drawing content to be displayed by a display screen. In some embodiments, the processor 1601 may further include an artificial intelligence (AI) processor. The AI processor is configured to process a calculation operation related to machine learning.

The memory 1602 may include one or more computer-readable storage media. The computer-readable storage media may be non-transient. The memory 1602 may further include a high-speed random access memory, and a non-volatile memory such as one or more magnetic disk storage devices and a flash memory device. In some embodiments, the non-transient computer-readable storage medium in the memory 1602 is configured to store at least one instruction. The at least one instruction is executed by the processor 1601 to perform the virtual object control method provided in the method embodiment in the present disclosure.

In some embodiments, the computer device 1600 further optionally includes a peripheral device interface 1603 and at least one peripheral device. The processor 1601, the memory 1602, and the peripheral device interface 1603 may be connected through a bus or a signal cable. Each peripheral device may be connected to the peripheral device interface 1603 through a bus, a signal cable, or a circuit board. Specifically, the peripheral device includes: at least one of a radio frequency (RF) circuit 1604, a touch display screen 1605, a camera component 1606, an audio frequency circuit 1607, a positioning component 1608, and a power supply 1609.

The peripheral device interface 1603 may be configured to connect at least one peripheral device related to input/output (I/O) to the processor 1601 and the memory 1602. In some embodiments, the processor 1601, the memory 1602, and the peripheral device interface 1603 are integrated into the same chip or circuit board. In some other embodiments, any one or two of the processor 1601, the memory 1602, and the peripheral device interface 1603 may be implemented on an independent chip or circuit board, and the implementation is not limited in this embodiment.

The radio frequency circuit 1604 is configured to receive and transmit a radio frequency (RF) signal, also referred to as an electromagnetic signal. The radio frequency circuit 1604 communicates with a communications network and another communications device by using the electromagnetic signal. The radio frequency circuit 1604 may convert an electric signal into an electromagnetic signal for transmission, or convert a received electromagnetic signal into an electric signal. Optionally, the radio frequency circuit 1604 includes an antenna system, an RF transceiver, one or more amplifiers, a tuner, an oscillator, a digital signal processor, a codec chip set, a subscriber identity module card, and the like. The RF circuit 1604 may communicate with other terminals through at least one wireless communication protocol. The wireless communication protocol includes, but is not limited to, the World Wide Web, a metropolitan area network, an intranet, generations of mobile communications networks (2G, 3G, 4G, and 5G), a wireless local area network, and/or a wireless fidelity (Wi-Fi) network. In some embodiments, the radio frequency circuit 1604 may further include a near field communication (NFC) related circuit, and is not limited in the present disclosure.

The display screen 1605 is configured to display a user interface (UI). The UI may include a graph, text, an icon, a video, and any combination thereof. In a case that the display screen 1605 is a touch screen, the display screen 1605 is further capable of collecting a touch signal on or over a surface of the display screen 1605. The touch signal may be inputted into the processor 1601 as a control signal for processing. In this case, the display screen 1605 may be further configured to provide a virtual button and/or a virtual keyboard, also referred to as a soft button and/or a soft keyboard. In some embodiments, there is one display screen 1605, disposed on a front panel of the computer device 1600. In some other embodiments, there may be two display screens 1605, respectively disposed on different surfaces of the computer device 1600 or designed in a foldable shape. In still some other embodiments, the display screen 1605 may be a flexible display screen, disposed on a curved surface or a folded surface of the computer device 1600. Even, the display screen 1605 may be further set to have a non-rectangular irregular graph, that is, a special-shaped screen. The display screen 1605 may be manufactured by using a material such as a liquid crystal display (LCD), an organic light-emitting diode (OLED), or the like.

The camera component 1606 is configured to collect an image or a video. Optionally, the camera component 1606 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1606 may further include a flash. The flash may be a single color temperature flash or a double color temperature flash. The double color temperature flash refers to a combination of a warm flash and a cold flash, and may be configured to perform light ray compensation at different color temperatures.

The audio circuit 1607 may include a microphone and a loudspeaker. The loudspeaker is configured to collect sound waves of a user and an environment, and convert the sound waves into electric signals and input the electrical signals into the processor 1601 for processing, or input the electrical signals into the radio frequency circuit 1604 to implement speech communication. For the purpose of stereo sound collection or noise reduction, there may be a plurality of microphones, respectively disposed at different parts of the computer device 1600. The microphone may be further a microphone array or an omni-directional collection microphone. The loudspeaker is configured to convert electric signals from the processor 1601 or the radio frequency circuit 1604 into sound waves. The loudspeaker may be a conventional thin-film loudspeaker or a piezoelectric ceramic loudspeaker. In a case that the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 1607 may further include an earphone jack.

The positioning component 1608 is configured to position a current geographic location of the computer device 1600, to implement navigation or a location based service (LBS). The positioning component 1608 may be a positioning component based on the global positioning system (GPS) of the United States, the Beidou system of China, or the Galileo system of Russia.

The power supply 1609 is configured to supply power to components in the computer device 1600. The power supply 1609 may be an alternating current, a direct current, a primary battery, or a rechargeable battery. In a case that the power supply 1609 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the computer device 1600 further includes one or more sensors 1610. The one or more sensors 1610 include, but are not limited to, an acceleration sensor 1611, a gyroscope sensor 1612, a pressure sensor 1613, a fingerprint sensor 1614, an optical sensor 1615, and a proximity sensor 1616.

The acceleration sensor 1611 may detect acceleration on three coordinate axes of a coordinate system established by the computer device 1600. For example, the acceleration sensor 1611 may be configured to detect components of gravity acceleration on the three coordinate axes. The processor 1601 may control, according to a gravity acceleration signal collected by the acceleration sensor 1611, the display screen 1605 to display the user interface in a frame view or a portrait view. The acceleration sensor 1611 may be further configured to collect motion data of a game or a user.

The gyroscope sensor 1612 may detect a body direction and a rotation angle of the computer device 1600. The gyroscope sensor 1612 may cooperate with the acceleration sensor 1611 to collect a 3D action by the user on the computer device 1600. The processor 1601 may implement the following functions according to data collected by the gyroscope sensor 1612: motion sensing (for example, the UI is changed according to a tilt operation of the user), image stabilization during shooting, game control, and inertial navigation.

The pressure sensor 1613 may be disposed on a side frame of the computer device 1600 and/or a lower layer of the touch display screen 1605. In a case that the pressure sensor 1613 is disposed on the side frame of the computer device 1600, a holding signal of the user on the computer device 1600 may be detected. The processor 1601 performs left and right hand recognition or a quick operation according to the holding signal collected by the pressure sensor 1613. In a case that the pressure sensor 1613 is disposed on the low layer of the display screen 1605, the processor 1601 controls, according to a pressure operation of the user on the display screen 1605, an operable control on the UI. The operable control includes at least one of a button control, a scroll bar control, an icon control, and a menu control.

The fingerprint sensor 1614 is configured to collect a fingerprint of the user. The processor 1601 identifies an identity of the user according to the fingerprint collected by the fingerprint sensor 1614, or the fingerprint sensor 1614 identifies an identity of the user according to the collected fingerprint. In a case that the identity of the user is identified as a trusted identity, the processor 1601 authorizes the user to perform a related sensitive operation. The sensitive operation includes unlocking a screen, viewing encrypted information, downloading software, payment, changing settings, and the like. The fingerprint sensor 1614 may be disposed on a front face, a back face, or a side face of the computer device 1600. In a case that a physical button or a vendor logo is disposed on the computer device 1600, the fingerprint sensor 1614 may be integrated together with the physical button or the vendor logo.

The optical sensor 1615 is configured to collect ambient light intensity. In an embodiment, the processor 1601 may control display luminance of the display screen 1605 according to the ambient light intensity collected by the optical sensor 1615. Specifically, in a case that the ambient light intensity is relatively high, the display luminance of the display screen 1605 is increased. In a case that the ambient light intensity is relatively low, the display luminance of the display screen 1605 is reduced. In another embodiment, the processor 1601 may further dynamically adjust shooting parameters of the camera component 1606 according to the ambient light intensity collected by the optical sensor 1615.

The proximity sensor 1616, also referred to as a distance sensor, is usually disposed on the front panel of the computer device 1600. The proximity sensor 1616 is configured to collect a distance between a front face of the user and the front face of the computer device 1600. In an embodiment, in a case that the proximity sensor 1616 detects that the distance between the front face of the user and the front face of the computer device 1600 is gradually decreased, the processor 1601 controls the touch display screen 1605 to switch from a screen-on state to a screen-off state. In a case that the proximity sensor 1616 detects that the distance between the front face of the user and the front face of the computer device 1600 is gradually increased, the processor 1601 controls the touch display screen 1605 to switch from the screen-off state to the screen-on state.

A person skilled in the art may understand that a structure shown in FIG. 16 constitutes no limitation on the computer device 1600, and the computer device may include more or fewer components than those shown in the figure, or some components may be combined, or a different component deployment may be used.

In an exemplary embodiment, a non-temporary computer-readable storage medium including an instruction is further provided. For example, the non-temporary computer-readable storage medium includes at least one instruction, at least one program, a code set, or an instruction set. The at least one instruction, the at least one program, the code set, or the instruction set may be executed by a processor to implement all or some steps of the method shown according to any embodiment in FIG. 3, FIG. 4, or FIG. 13. For example, the non-temporary computer-readable storage medium may be a ROM, a random access memory (RAM), a CD-ROM, a magnetic tape, a floppy disk, an optical data storage device, or the like.

After considering the specification and implementing the present disclosure, a person skilled in the art can readily think of other implementations of the present disclosure. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure. The specification and the embodiments are considered as merely exemplary, and the real scope and spirit of the present disclosure are pointed out in the following claims.

It is to be understood that the present disclosure is not limited to the precise structures described above and shown in the accompanying drawings, and various modifications and changes can be made without departing from the scope of the present disclosure. The scope of the present disclosure is subject only to the appended claims.

What is claimed is:

1. A virtual object control method, performed by a first terminal comprising a processor and a touch screen, and the method comprising:
   displaying, on the touch screen, a path drawing interface that comprises a map of a virtual environment;
   detecting, by the processor, a drawing operation on the map of the virtual environment, the drawing operation including touch events performed on a part of the touch screen that displays the map of the virtual environment;
   obtaining, by the processor, a path finding instruction associated with a virtual object in the virtual environment according to an operation track of the drawing operation performed in the path drawing interface;
   generating, by the processor, a moving path according to the path finding instruction;
   controlling, by the processor, the virtual object to move along the moving path in the virtual environment;
   after receiving the path finding instruction, stop displaying the path drawing interface including the map and switching to display the game play interface; and
   displaying, on the touch screen, movement of the virtual object that follows the moving path in the virtual environment on the game play interface, wherein the game play interface is an interface that presents game play scenes of the virtual environment and is different from the path drawing interface.

2. The method according to claim 1, wherein the obtaining a path finding instruction comprises:
   obtaining a first instruction triggered by the drawing operation, the first instruction comprising location information of at least three operating points on the operation track of the drawing operation; and
   the generating a moving path according to the path finding instruction comprises:
   generating the moving path according to the location information of the at least three operating points on the operation track of the drawing operation.

3. The method according to claim 2, wherein the obtaining a first instruction triggered by the drawing operation comprises:
   obtaining the operation track of the drawing operation performed in the path drawing interface;
   sampling the operation track according to a preset sampling rule to obtain the location information of the at least three operating points, the at least three operating points comprising a starting point, an endpoint, and at least one middle point of the operation track; and
   generating the first instruction comprising the location information of the at least three operating points on the operation track of the drawing operation.

4. The method according to claim 3, wherein the sampling the operation track according to a preset sampling rule to obtain the location information of the at least three operating points comprises:
   dividing the operation track into at least two track segments;

obtaining respective curvatures of the at least two track segments;

obtaining respective sampling rates of the at least two track segments according to the respective curvatures of the at least two track segments; and sampling the at least two track segments respectively according to the respective sampling rates of the at least two track segments, to obtain the location information of the at least three operating points.

5. The method according to claim 2, wherein the generating the moving path according to the location information of the at least three operating points on the operation track of the drawing operation comprises:

obtaining at least three location points respectively corresponding to the location information of the at least three operating points in the virtual environment;

generating sub-paths between each two adjacent location points in the at least three location points according to a preset path generating algorithm; and joining the sub-paths between each two adjacent location points in the at least three location points together to form the moving path.

6. The method according to claim 5, wherein before the generating sub-paths between each two adjacent location points in the at least three location points according to a preset path generating algorithm, the method further comprises:

detecting whether a target location point is an effective location point, the target location point being any location point in the at least three location points, and the effective location point being a location point in a region of the virtual environment that the virtual object has an ability to reach in the virtual environment;

when the target location point is not an effective location point, determining a first effective location point, the first effective location point being an effective location point closest to the target location point other than the at least three location points;

determining whether a distance between the target location point and the first effective location point is less than a preset distance threshold;

when a distance between the target location point and the first effective location point is less than the preset distance threshold, replacing the target location point with the first effective location point; and when a distance between the target location point and the first effective location point is not less than the preset distance threshold, removing the target location point from the at least three location points.

7. The method according to claim 2, wherein before the generating the moving path according to the location information of the at least three operating points on the operation track of the drawing operation, the method further comprises:

obtaining a quantity of effective points in the at least three operating points, a location point in the virtual environment corresponding to the effective point being a location point in a region of the virtual environment that the virtual object has an ability to reach; and the generating the moving path according to the location information of the at least three operating points on the operation track of the drawing operation comprises:

when a ratio of the quantity of the effective points to the quantity of the at least three operating points is greater than a preset value, generating the moving path according to the location information of the at least three operating points on the operation track of the drawing operation.

8. The method according to claim 2, further comprising:

transmitting path instructing information to a second terminal, the path instructing information being used for instructing the second terminal to control a virtual object corresponding to the second terminal to move along the moving path in the virtual environment.

9. The method according to claim 1, wherein the obtaining a path finding instruction comprises:

displaying a moving path selection interface, the moving path selection interface comprising at least one candidate path;

obtaining a second instruction, the second instruction being an instruction triggered by a path selecting operation performed in the moving path selection interface, and the second instruction indicating a candidate path corresponding to the path selecting operation; and the obtaining a moving path according to the path finding instruction comprises:

obtaining the candidate path indicated by the second instruction as the moving path.

10. The method according to claim 9, wherein before the displaying a moving path selection interface, the method further comprises:

receiving path instructing information transmitted by a third terminal, the path instructing information indicating some or all candidate paths in the at least one candidate path, and the candidate path indicated by the path instructing information being a path generated by the third terminal according to an operation track of a drawing operation performed in a path drawing interface on the third terminal.

11. The method according to claim 1, further comprising:

after generating the moving path, displaying, on the touch screen, the moving path on the map of the virtual environment in the path drawing interface.

12. A virtual object control apparatus, comprising: a touch screen, a memory and a processor coupled to the memory, the processor being configured to:

display, on the touch screen, a path drawing interface that comprises a map of a virtual environment;

detect a drawing operation on the map of the virtual environment, the drawing operation including touch events performed on a part of the touch screen that displays the map of the virtual environment;

obtain a path finding instruction associated with a virtual object in the virtual environment according to an operation track of the drawing operation performed in the path drawing interface;

generate a moving path according to the path finding instruction;

control the virtual object to move along the moving path in the virtual environment;

after receiving the path finding instruction, stop displaying the path drawing interface including the map and switching to display the game play interface; and display, on the touch screen, movement of the virtual object that follows the moving path in the virtual environment on a game play interface, wherein the game play interface is an interface that presents game play scenes of the virtual environment and is different from the path drawing interface.

13. The apparatus according to claim 12, wherein the processor is further configured to:

obtain a first instruction triggered by the drawing operation, the first instruction comprising location information of at least three operating points on the operation track of the drawing operation; and generate the moving path according to the location information of the at least three operating points on the operation track of the drawing operation.

14. The apparatus according to claim 13, wherein the processor is further configured to:

obtain the operation track of the drawing operation performed in the path drawing interface;

sample the operation track according to a preset sampling rule to obtain the location information of the at least three operating points, the at least three operating points comprising a starting point, an endpoint, and at least one middle point of the operation track; and generate the first instruction comprising the location information of the at least three operating points on the operation track of the drawing operation.

15. The apparatus according to claim 14, wherein the processor is further configured to:

divide the operation track into at least two track segments;

obtain respective curvatures of the at least two track segments;

obtain respective sampling rates of the at least two track segments according to the respective curvatures of the at least two track segments; and sample the at least two track segments respectively according to the respective sampling rates of the at least two track segments, to obtain the location information of the at least three operating points.

16. The apparatus according to claim 13, wherein the processor is further configured to:

obtain at least three location points respectively corresponding to the location information of the at least three operating points in the virtual environment;

generate sub-paths between each two adjacent location points in the at least three location points according to a preset path generating algorithm; and join the sub-paths between each two adjacent location points in the at least three location points together to form the moving path.

17. The apparatus according to claim 16, wherein before the generating sub-paths between each two adjacent location points in the at least three location points according to a preset path generating algorithm, the processor is further configured to:

detect whether a target location point is an effective location point, the target location point being any location point in the at least three location points, and the effective location point being a location point accessible to the virtual object in the virtual environment;

when the target location point is not an effective location point, determine a first effective location point, the first effective location point being an effective location point closest to the target location point other than the at least three location points;

determine whether a distance between the target location point and the first effective location point is less than a preset distance threshold;

when a distance between the target location point and the first effective location point is less than the preset distance threshold, replace the target location point with the first effective location point; and when a distance between the target location point and the first effective location point is not less than the preset distance threshold, remove the target location point from the at least three location points.

18. The apparatus according to claim 13, wherein before the generating the moving path according to the location information of the at least three operating points on the operation track of the drawing operation, the processor is further configured to:

obtain a quantity of effective points in the at least three operating points, a location point in the virtual environment corresponding to the effective point being a location point accessible to the virtual object; and when a ratio of the quantity of the effective points to the quantity of the at least three operating points is greater than a preset value, generate the moving path according to the location information of the at least three operating points on the operation track of the drawing operation.

19. A non-transitory computer-readable storage medium, the storage medium storing at least one instruction, at least one program, a code set, or an instruction set, and the at least one instruction, the at least one program, the code set, or the instruction set being loaded and executed by a processor of a terminal to implement:

displaying, on a touch screen of the terminal, a path drawing interface that comprises a map of a virtual environment;

detecting, by the processor, a drawing operation on the map of the virtual environment, the drawing operation including touch events performed on a part of the touch screen that displays the map of the virtual environment;

obtaining, by the processor, a path finding instruction associated with a virtual object in the virtual environment according to an operation track of the drawing operation performed in the path drawing interface;

generating, by the processor, a moving path according to the path finding instruction;

controlling, by the processor, the virtual object to move along the moving path in the virtual environment;

after receiving the path finding instruction, stop displaying the path drawing interface including the map and switching to display the game play interface; and displaying, on the touch screen, movement of the virtual object that follows the moving path in the virtual environment on a game play interface, wherein the game play interface is an interface that presents game play scenes of the virtual environment and is different from the path drawing interface.

* * * * *